United States Patent [19]
Sato

[11] Patent Number: 5,499,179
[45] Date of Patent: Mar. 12, 1996

[54] DECOMPRESSION DATA DISPLAY DEVICES

[75] Inventor: Hiroshi Sato, Hamura, Japan

[73] Assignee: Casio Computer Co., Ltd., Tokyo, Japan

[21] Appl. No.: 266,424

[22] Filed: Jun. 27, 1994

[30] Foreign Application Priority Data

Jun. 30, 1993 [JP] Japan ................... 5-160718

[51] Int. Cl.$^6$ ................................. G06F 15/42
[52] U.S. Cl. ................... 364/413.31; 128/201.27
[58] Field of Search ............... 128/201.27, 202.22, 128/202.27, 204.21, 204.22, 204.23, 204.26, 205.22, 205.23; 364/413.31

[56] References Cited

U.S. PATENT DOCUMENTS

| | | | |
|---|---|---|---|
| 4,005,282 | 1/1977 | Jennings . | |
| 4,054,783 | 10/1977 | Seireg et al. . | |
| 4,192,001 | 3/1980 | Villa . | |
| 4,658,358 | 4/1987 | Leach et al. | 128/204.23 |
| 4,782,338 | 11/1988 | Barshinger . | |
| 4,882,678 | 11/1989 | Hollis et al. | 128/204.23 |
| 4,999,606 | 3/1991 | Comerford et al. | 128/201.27 |
| 5,049,864 | 9/1991 | Barshinger . | |
| 5,301,668 | 4/1994 | Hales | 128/204.26 |
| 5,351,188 | 9/1994 | Sato | 128/201.27 |
| 5,363,298 | 11/1994 | Survanshi et al. | 364/413.31 |

OTHER PUBLICATIONS

Thalmann, E. D. "Phase II Testing of Decompression Algorithms for Use in the U.S. Navy Underwater Decompression Computer," Panama City, Fl.: NEDU Report 1–84, Jan. 1984.

Primary Examiner—Angela D. Sykes
Assistant Examiner—Eric F. Winakur
Attorney, Agent, or Firm—Frishauf, Holtz, Goodman, Langer & Chick

[57] ABSTRACT

A decompression data display device which calculates during a diver's dive the partial pressure of an inert gas in each of the tissues of the diver's body with the tissues having different half saturation times. The inert gas partial pressure of the inspired gas is compared with each of the partial pressures of the respective inert gases solved in the tissues to determine whether the inert gas is being discharged or absorbed. When the inert gas is being discharged, the respective inert gas partial pressure values in the tissues are calculated from an arithmetic expression different from an arithmetic expression used when the inert gas is being absorbed, and decompression data is obtained from the respective calculated inert gas partial pressure values in the tissues.

30 Claims, 17 Drawing Sheets

RAM15

| dep | | PB | |
|---|---|---|---|
| QN2 (1) ~ QN2 (9) | | | |
| PN2 (1) ~ PN2 (9) | | | |
| tx(1) ~ tx(9) | | tx | |
| SD(1) ~ SD(9) | | SD | |
| ty(1) ~ ty(9) | | ty | |
| tz(1) ~ tz(9) | | tz | |
| txp(1) ~ txp(9) | | txp | |
| yd | | i | |
| FS | Mdep | Tdep | C | l | P |

RM1 {

| DIVE DATE | SURFACE RECESS TIME | DIVE DATE | SURFACE RECESS TIME |
|---|---|---|---|
| MAX DEPTH | AVERAGE DEPTH | MAX DEPTH | AVERAGE DEPTH |
| START TIME | DIVE TIME | START TIME | DIVE TIME |
| DANGER ABNORMAL | FINISH TIME | DANGER ABNORMAL | FINISH TIME |

} KM1

| RM10 | KM10 |
|---|---|

| FK | KS1 | KS2 | KS3 | KS4 | KS5 |

FIG.2

HALF SATURATION TIME AND (DISCHARGE RATE)
COEFFICIENT OF EACH TISSUE

| HALF SAT. TIME [MIN] | Ht(1) 2.5 | Ht(2) 5 | Ht(3) 10 | Ht(4) 20 | Ht(5) 40 | Ht(6) 80 | Ht(7) 120 | Ht(8) 240 | Ht(9) 320 |
|---|---|---|---|---|---|---|---|---|---|
| COEFF. | 3 | 3 | 3 | 2 | 2 | 1.5 | 1.5 | 1.5 | 1.0 |

FIG.7

Ptol OF EACH TISSUE AT RESPECTIVE DEPTHS
[bar : ABSOLUTE PRESSURE]

| HALF SAT. TIME | Ht(1) 2.5 | Ht(2) 5 | Ht(3) 10 | Ht(4) 20 | Ht(5) 40 | Ht(6) 80 | Ht(7) 120 | Ht(8) 240 | Ht(9) 320 |
|---|---|---|---|---|---|---|---|---|---|
| INCREASED VALUE | 0.55 | 0.52 | 0.45 | 0.42 | 0.40 | 0.37 | 0.35 | 0.33 | 0.31 |
| DEPTH | | | | | | | | | |
| 0.0m | 2.90 | 2.90 | 2.50 | 2.00 | 1.77 | 1.56 | 1.45 | 1.28 | 1.10 |
| 3.0m | 3.45 | 3.42 | 2.95 | 2.42 | 2.17 | 1.93 | 1.80 | 1.61 | 1.41 |
| 6.0m | 4.00 | 3.94 | 3.40 | 2.84 | 2.57 | 2.30 | 2.15 | 1.94 | 1.72 |
| 9.0m | 4.55 | 4.46 | 3.85 | 3.26 | 2.97 | 2.67 | 2.50 | 2.27 | 2.03 |
| 12.0m | 5.10 | 4.98 | 4.30 | 3.68 | 3.37 | 3.04 | 2.85 | 2.60 | 2.34 |

FIG.8

REMAINING NITROGEN PARTIAL PRESSURE IN EACH TISSUE
WHERE DISCHARGE OF NITROGEN REMAINING IN THAT TISSUE
IS REGARDED AS COMPLETED

| HALF SAT. TIME [MIN] | Ht(1) 2.5 | Ht(2) 5 | Ht(3) 10 | Ht(4) 20 | Ht(5) 40 | Ht(6) 80 | Ht(7) 120 | Ht(8) 240 | Ht(9) 320 |
|---|---|---|---|---|---|---|---|---|---|
| $P_{de}(i)$ | 2.35 | 2.38 | 2.05 | 1.58 | 1.37 | 1.19 | 1.10 | 0.95 | 0.79 |

FIG.13

DISPLAY OF NON-DECOMPRESSION
DIVABLE TIME
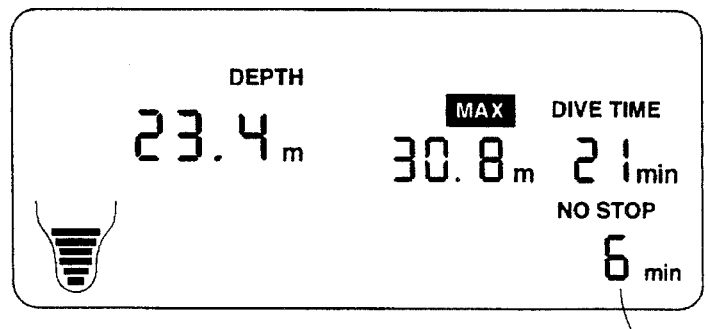
FIG.10A NON-DECOMPRESSION
DIVABLE TIME
DISPLAY OF DECOMPRESSION
DEPTH-DECOMPRESSION TIME
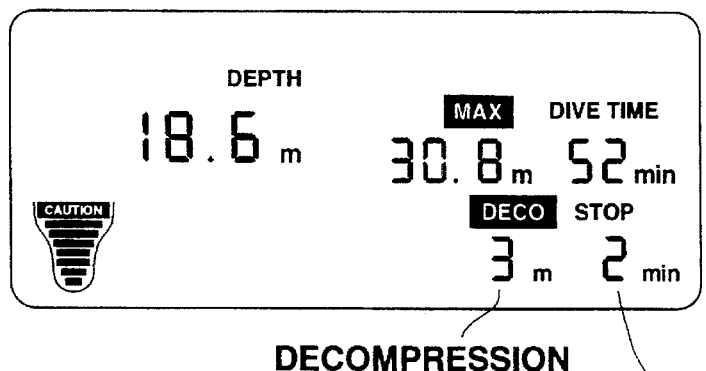
DECOMPRESSION
DEPTH
DECOMPRESSION
FIG.10B TIME
SURFACE
RECESS TIME
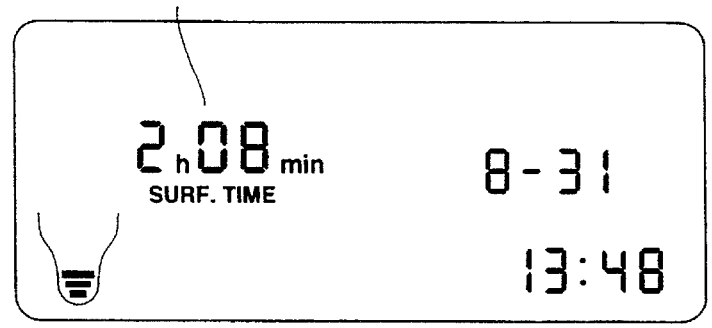
FIG.10C

WHEN DISPLAY
WARNS OF
RISING SPEED
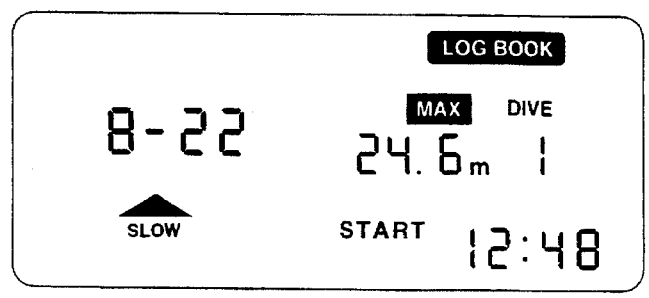
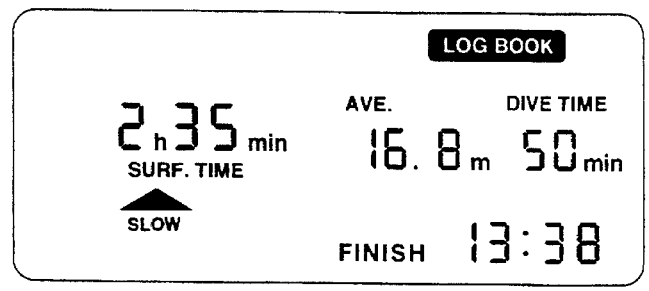
THOSE PAGES ARE
DISPLAYED ALTERNATELY
AT INTERVALS
OF 2 SECONDS
FIG.17A
WHEN INSTRUCTIONS
TO STOP FOR
DECOMPRESSION
WERE IGNORED
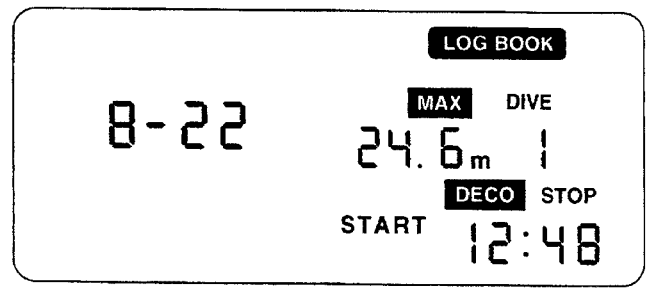
THOSE PAGES ARE
DISPLAYED ALTERNATELY
AT INTERVALS
OF 2 SECONDS
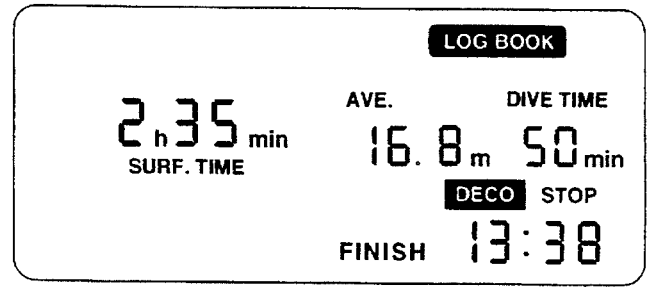
FIG.17B

DISPLAY OF DIVE PLAN MODE

DECOMPRESSION DATA DISPLAY DEVICES

BACKGROUND OF THE INVENTION

The present invention relates to decompression data display devices which calculate inert gas partial pressures in the tissues of the body of a diver different in half saturation time during diving, and obtain and display data for a non-decompression dive or a decompression dive from the inert gas partial pressures.

When a diver stays or stops at a position deeper than a particular water depth for more than a given amount of time, he requires a decompression operation in which he stays for a predetermined amount of time at a designated depth so as to avoid suffering from caisson disease when he rises to the surface of the water.

In order to accurately calculate the decompression depth and time for the decompression operation, it is necessary to accurately know inert gas partial pressures solved in the respective tissues of the diver's body.

To this end, decompression data display devices have been invented which calculate the amounts of nitrogen in the respective tissues of the body of a diver during diving on a real time basis, and obtain and display data for appropriate decompression from the calculated amounts of nitrogen, as disclosed in U.S. Pat. Nos. 4,005,282, 4,192,001, 4,054,783, 4,782,338, and 5,049,864, and U.S. patent application Ser. No. 07/976,399 (now U.S. Pat. No. 5,351,188) whose inventor is the same as the present inventor.

Those devices classify the tissues of the diver's body in accordance with a half saturation time, which is the time required for an amount of nitrogen solved or discharged into or from a tissue to reach 50% of its saturated amount, in consideration of the fact that the rates of solution or discharge of nitrogen into or from the respective tissues of the diver's body vary from tissue to tissue, calculate nitrogen partial pressures in the respective tissues of the diver's body, using data on the half saturation time, etc., calculate data for a non-decompression or decompression dive from the nitrogen partial pressures and a safety limit nitrogen partial pressure and display that data.

There is, however, the problem that since the nitrogen partial pressures in the tissues cannot be calculated with high accuracy in the conventional decompression data display devices, accurate decompression data cannot be obtained.

Thus, decompression data must be calculated and displayed in consideration of enough safety. Therefore, if, for example, the remaining time until the non-decompression limit is to be calculated from the nitrogen partial pressures in the respective tissues and displayed, the device can display that there is no remaining time until the non-decompression limit although there is enough such time actually, thereby reducing the dive time.

SUMMARY OF THE INVENTION

It is therefore an object of the present invention to provide a decompression data display device which accurately calculates inert gas partial pressures in the respective tissues of a diver's body to provide accurate decompression data to thereby improve safety and increase the dive time.

In order to achieve the above object, the present invention provides a decompression data display device, comprising:

pressure sensing means for sensing the pressure of an environment in which a diver is;

determining means for determining whether the respective tissues of the diver's body are absorbing or discharging an inert gas;

tissue inert gas level data calculating means for calculating from the pressure sensed by the pressure sensing means data on the level of the inert gas in each of the tissues in accordance with a first arithmetic expression when the determining means determines that the tissues are absorbing the inert gas, and for calculating from the pressure sensed by the pressure sensing means data on the level of the inert gas in each of the tissues in accordance with a second arithmetic expression different from the first arithmetic expression when the determining means determines that the tissues are discharging the inert gas;

decompression data calculating means for calculating decompression data from data on the levels of the inert gases in the respective tissues calculated by the tissue inert gas level data calculating means; and display means for displaying the decompression data calculated by the decompression data calculating means.

According to this arrangement, the inert gas partial pressure in the inspired gas is compared with the partial pressures of the respective inert gases solved in the tissues to determine whether the inert gas is being discharged or inspired. When the inert gas is being discharged, the partial pressures of the respective inert gases in the tissues are calculated from an arithmetic expression different from the expression used when the inert gas is being inspired, and decompression data is obtained from the partial pressure values of the respective calculated inert gas in the tissues. Thus, accurate decompression data is provided to the user to thereby increase safety and the dive time.

BRIEF DESCRIPTION OF THE DRAWINGS

FIG. 2 shows the structure of a RAM of FIG. 1;

FIG. 7 shows the relationship between a half saturation time of each of the tissues and a discharge rate coefficient;

FIG. 8 shows allowable supersaturated nitrogen partial pressures of the tissues at different depths;

FIG. 10A shows a displayed example of data produced during a non-decompression dive;

FIG. 10B shows a displayed example of data produced during a decompression dive;

FIG. 10C shows a displayed example of data produced during measurement of a water surface recess time;

FIG. 13 shows tissue nitrogen partial pressures below which the discharge of the nitrogen remaining in the respective tissues is regarded as completed;

FIGS. 17A and 17B show a display example of data produced when danger/abnormality data is read;

DESCRIPTION OF THE PREFERRED EMBODIMENT

Figure 1:
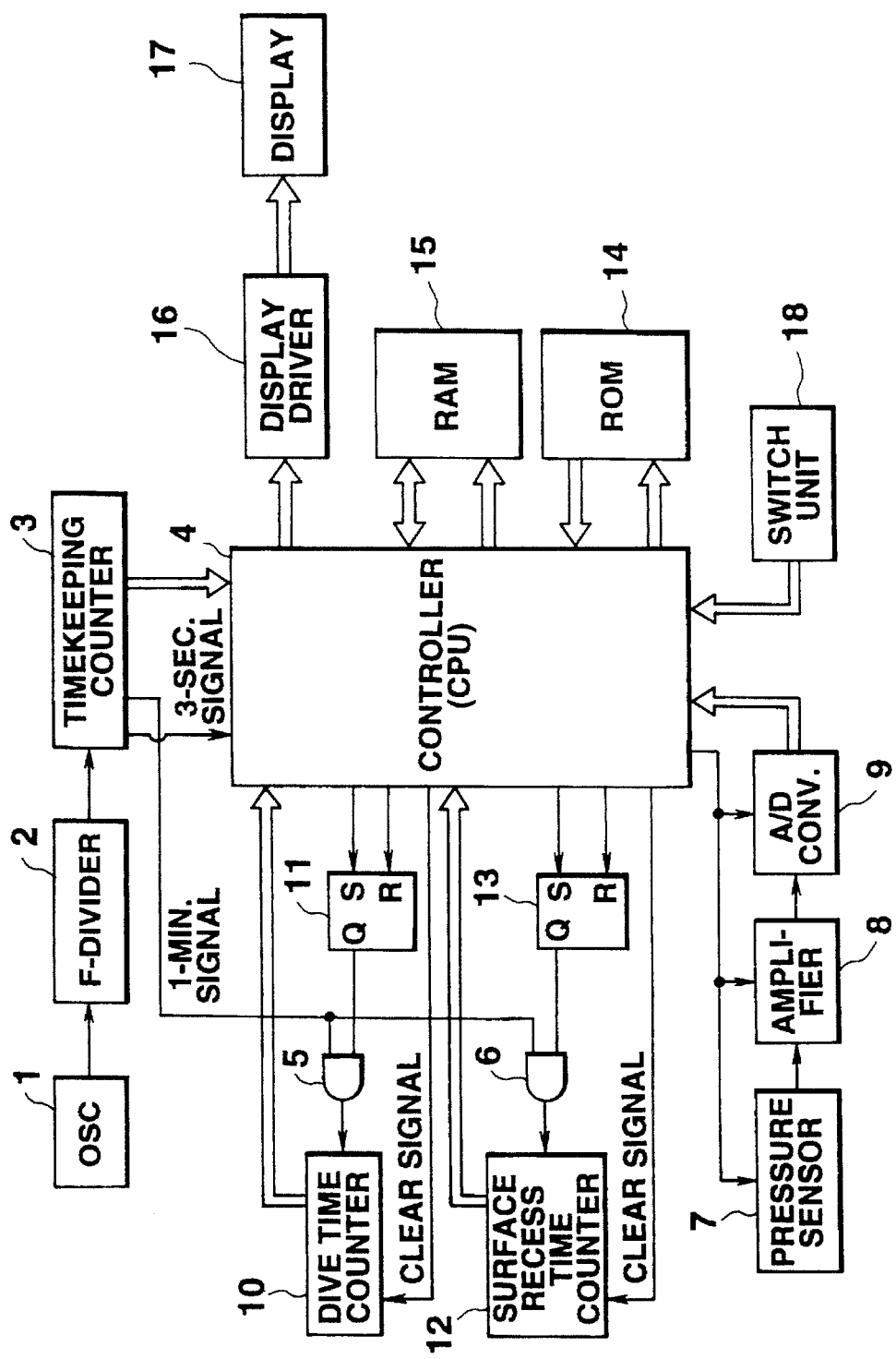
FIG. 1 is a block diagram of the circuit configuration of a decompression data display device according to the present invention.

An embodiment of the present invention will be described with respect to the drawings. FIG. 1 is a block diagram of an electronic hydrobarometer of the embodiment which calculates nitrogen partial pressures of the respective tissues of a diver's body on a real time basis, obtains decompression data from the nitrogen partial pressures, a water depth where the diver's body is, and his dive time, and displays the decompression data.

In FIG. 1, an oscillator 1 generates a signal of a given frequency, which is then divided by a frequency divider 2, and the resulting signal is output to a time counter 3. The time counter counts signals from the frequency divider 2 and outputs to a controller (CPU) 4 a clock signal as a reference for the operation of the controller 4 and a 3-second signal as a reference for pressure measurement to be described later. The time counter 3 outputs a 1-minute signal as a reference for timekeeping purposes to AND gates 5 and 6.

A pressure sensor 7 senses an environmental pressure (atmospheric pressure+water pressure) for the diver and outputs an analog signal indicative of the sensed pressure to an amplifier 8, which amplifies the analog signal sufficiently and outputs the resulting signal to an A/D converter 9. The A/D converter 9 converts the signal from the amplifier 8 to a digital signal, which is then output to the controller 4. The pressure sensor 7, amplifier 8 and A/D converter 9 cooperate to measure the pressure in accordance with the 3-second signal from the controller 4.

A dive time counter 10 counts 1-minute signals from the time counter 3 through an AND gate 5 when the controller 4 has set an RS flip-flop 11, and outputs a signal indicative of the result of the counting as dive time data to the controller 4.

A surface recess time counter 12 counts 1-minute signals from the time counter 3 through an AND gate 6 when the controller 4 has set an RS flip-flop 13, and outputs a signal indicative of the result of the counting as surface recess time data to the controller 4. The results of the counting in the dive and surface recess time counters 10 and 12 are reset with a clear signal from the controller 4.

The controller 4 is a central processing unit which performs a dive starting operation, a danger/abnormality determining operation, etc., to be described later, in accordance with a control program stored in a ROM 14. The controller 4 drives a display driver 16 to display dive data stored in a RAM 15 on a display 17.

A switch unit 18 includes a plurality of switches which, in turn, includes respective mode switches (not shown) which select a depth measurement mode, a log book mode, and a dive plan mode and outputs a signal indicative of the selected mode to the controller 4.

Referring to FIG. 2, the register structure of the RAM 15 will be described below. In FIG. 2, a register dep stores data on a water depth calculated on the basis of a pressure sensed by the pressure sensor 7. A register PB stores data on a nitrogen partial pressure in the inspired air. Registers PN2(1)–PN2(9) store data items on nitrogen partial pressures measured last in the respective tissues of the diver's body. Registers QN2(1)–QN2(9) store data items on nitrogen partial pressures in the respective tissues present three seconds after the measurement (in the present embodiment, the pressure measurement is made every 3 seconds).

In the embodiment, the registers store data items on nitrogen partial pressures, non-decompression divable times and decompression water depths of each of nine tissues of the diver's body classified in accordance with a half saturation time (which is the time taken until the nitrogen partial pressure in a tissue reaches 50% of its saturated value).

Registers tx1–tx(9) store data items on non-decompression divable times of the respective tissues. A register tx stores data on the minimum value of the non-decompression times of the respective tissues.

Registers SD(1)–SD(9) store data items on decompression water depths of the respective tissues when decompression is required. A register SD stores the maximum value of the decompression depths of the respective tissues.

Registers ty(1)–ty(9) store data items on decompression stop or stay times (for which the diver is required to stop or stay for decompression) at the respective decompression depths when decompression is required. A register ty stores data on the maximum value of the decompression stop times at the maximum depression depths of the respective tissues (the longest decompression stop time of two or more tissues having the maximum decompression depth, if any).

Registers tz(1)–tz(9) store data items on the times taken for discharge of nitrogen remaining in the respective tissues. A register tz stores the maximum value of the times taken for discharge of nitrogen remaining in the respective tissues.

Registers txp(1)–txp(9) store data items on non-decompression divable times of the respective tissues calculated when a dive plan mode is set. A register txp stores data on the minimum value of the non-decompression divable times of the respective tissues. The dive plan mode is the one in which, when the user sets an expected dive depth, the time in which the user can dive until the expected depth in a non-decompression state is calculated and displayed beforehand.

A register yd stores data on an expected dive depth set by the user. A register i designates one of the nine tissues.

A register FS stores data on whether the water depth is more than 1 m. A register Mdep stores data on the maximum depth which the diver reaches between the beginning and end of the dive. A register Tdep stores data on the sum of the water depths measured every 3 seconds. A register C stores data on the number of times of measurement of the water depths. A pointer I designates one of log book data storages RM1–RM10 and dangerous/abnormal dive data storages KM1–KM10. A pointer P designates data on page 1 or 2 in the log book data storages RM1–RM10 and dangerous/abnormal dive data storages KM1–KM10.

The log book data storages RM1–RM10 store ten data items on normal dives and have a page "1" which includes a dive date storage, a maximum depth storage, a dive start time storage, and a danger/abnormality storage; and a page "2" which includes a surface recess time storage, an average depth storage, a dive time storage, and a dive finish time storage.

The dangerous/abnormal dive data storages KM1–KM10 store 10 data items on dangerous/abnormal dives and have a page "1" which includes a dive date storage, a maximum depth storage, a dive start time storage, and a danger/abnormality storage; and a page "2" which includes a surface recess time storage, an average depth storage, a dive time storage, and a dive finish time storage like the log book data storages RM1–RM10.

A flag FK stores data on whether a dangerous or abnormal dive was made and sets "1" therein when a dangerous or abnormal dive was made. Flags KS1–KS5 are for danger/abnormality. For example, the flag KS1 is set when the floating or rising speed is too high; the flag KS2 is set when no stop is made for decompression; the flag KS3 is set when the water depth is minus; the flag KS4 is set when the water depth is more than 80 m; and the flag KS5 is set when the dive time is more than 300 minutes. It is to be noted that when two or more kinds of dangers/abnormalities are detected, corresponding flags are set simultaneously.

The operation of the embodiment, thus constructed, will be described next with respect to the flowcharts and illustration of FIGS. 3–19.

Figure 3:
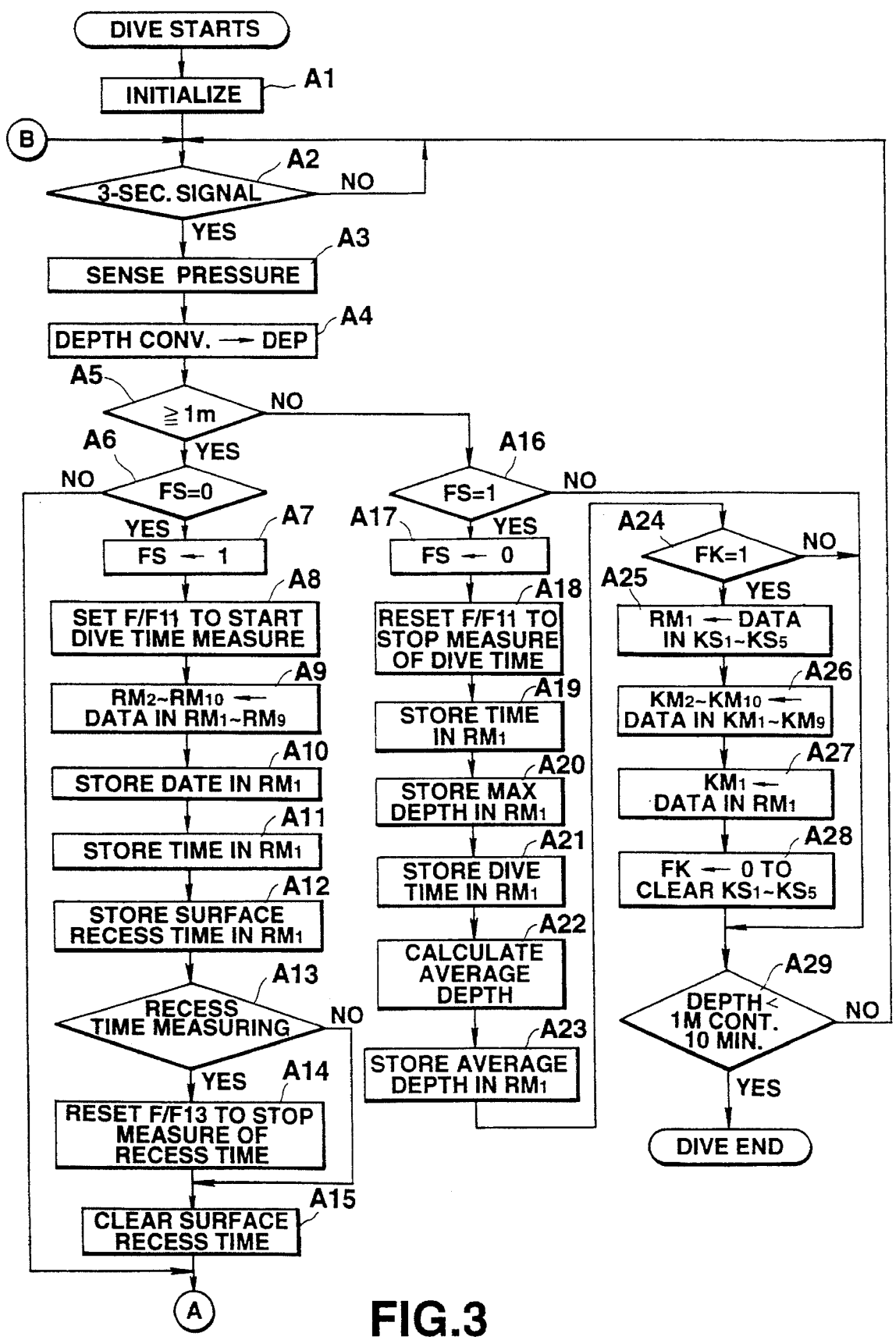
FIG. 3 is a flowchart indicative of a dive starting process started when a dive mode is selected in the decompression data display device of FIG. 1.

First, a dive starting process in a water depth measuring mode will be described with respect to the flowchart of FIG. 3. The controller 4 performs an initializing process at step A1 of FIG. 3 to initialize the registers and flags used for measuring the water depth. At step A2 the controller determines whether it has received a 3-second signal from the time counter 3. If so, control passes to step A3, where the controller outputs a measurement signal to the pressure sensor 7 and A/D converter 9 to start the pressure measurement. At step A4 the controller 4 calculates the water depth on the basis of the pressure sensed by the pressure sensor 7 and stores data on the calculated depth in the register dep of the RAM 15.

Next, at step A5 the controller determines whether the depth data stored in the register dep indicates a depth more than 1 m. If so, control passes to step A6, where the controller determines whether the flag FS is "0". If so, there is a probability that the diver moved from a position less than a 1 m depth to a position more than the 1 m depth. Thus, at step A7 the controller sets "1" in the flag FS to store data on the dive starting.

At step A8 the controller sets the flip-flop (F/F) 11 to start the measurement of the dive time, using the dive time counter 10. At step A9 the controller 4 sequentially shifts the dive data stored in the first through ninth dive data storages RM1–RM9 of the log book data storages RM1–RM10 to the second through tenth log data storages RM2–RM10.

When the data shift is completed, at step A10 the controller stores data on the current date at the dive date storage location of the first log book data storage RM1. At step A11 the controller stores data on the current time as the dive start time at the dive start time storage of the log book data storage RM1. In addition, at step A12 the controller stores data on the result of the counting by the surface recess counter 12 as a surface recess time at the surface recess time storage location of the log book data storage RM1.

Thereafter, at step A13 the controller determines whether the surface recess time is being measured. If so, control passes to step A14, where the controller resets the flip-flop (F/F) 13 to stop the measurement of the surface recess time. At step A15 the controller clears the result of the counting by the surface recess time counter 12.

By those processes the controller stores the dive data obtained at the start of the dive or data on the dive date and start time and, when the diver took a recess on the surface of the water, data on the surface recess time in the log book data storage RM1.

Subsequent to the step A15, the controller performs a danger/abnormality determining process at step B1 of FIG. 4, which will be described next with respect to a flowchart of FIG. 5.

Figure 5:
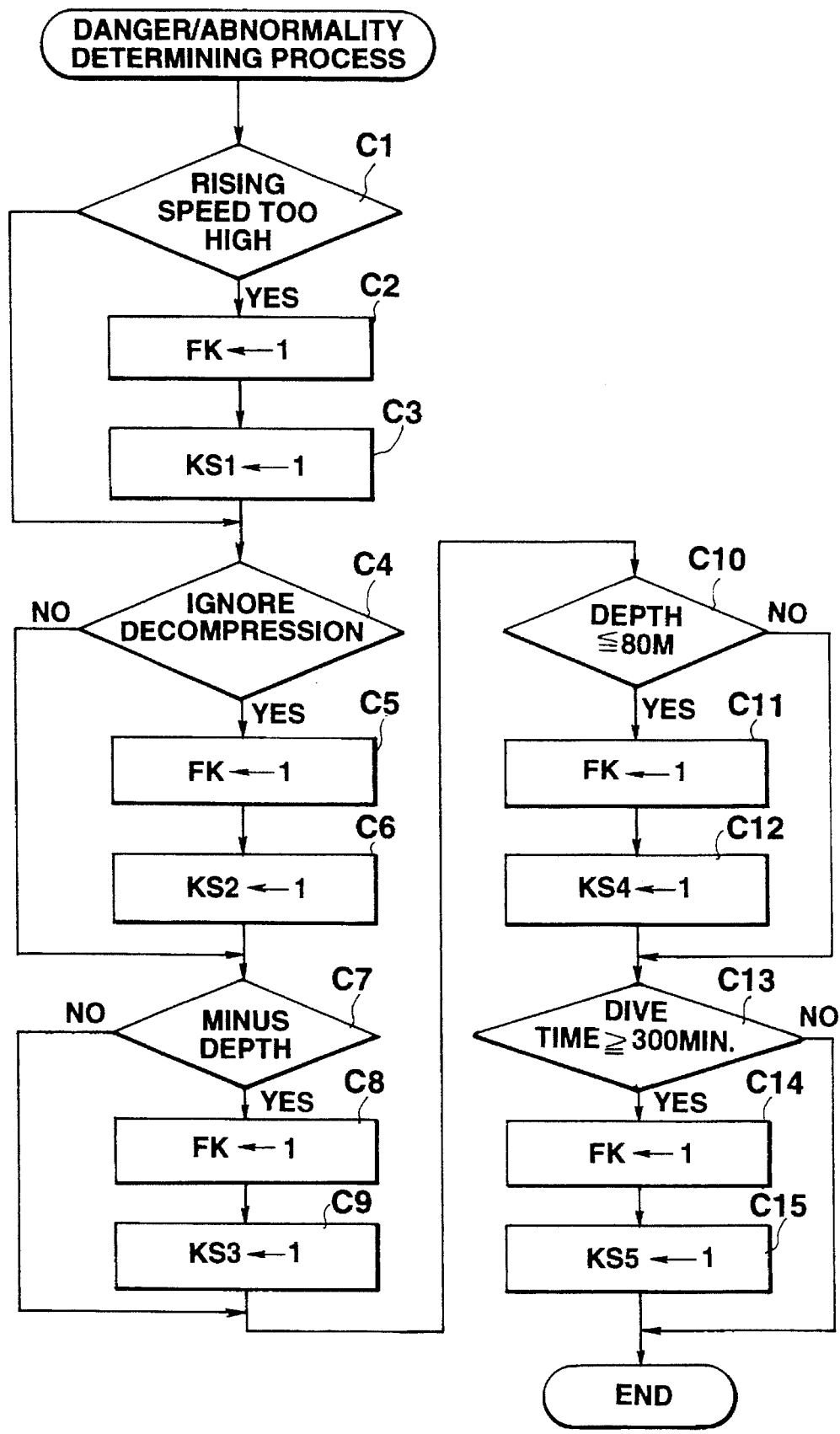
FIG. 5 is a flowchart indicative of the details of a danger/abnormality determining process of the flowchart of FIG. 4.

First, at step C1 of FIG. 5 the controller determines whether the rising speed is higher than a predetermined one. If so, control passes to step C2, where the controller sets "1" in the flag FK to thereby store data on a dangerous or abnormal dive made. At step C3, the controller sets "1" as the flag KS1 to store data on the fact that the rising speed was too high for the classification of danger/abnormality.

When the determination at step C1 is NO, or at step C4 after step C3 the controller determines whether a dive which ignored decompression was made. That is, when decompression is required, the controller determines whether the diver stopped or stayed for a predetermined time at a predetermined decompression depth. When the controller determines that the dive which ignored decompression was made in this determining process, control passes to step C5, where the controller sets "1" in the flag FK to store the fact that a dangerous or abnormal dive was made. At step C6 the controller stores "1" as the flag KS2 to store as the classification of danger/abnormality the fact that the rise which ignored decompression was made.

When the determination at step C4 is NO, or after step C6, control passes to step C7, where the controller determines whether the water depth is minus. If so, at step C8 the controller 4 sets "1" as the flag FK to store data on the occurrence of a danger or abnormality. At step C9 the controller sets "1" as the flag FK3 to store as the classification of danger/abnormality the fact that the water depth is minus.

When the determination at step C7 is NO, or after step C9, control passes to step C10, where the controller determines whether the water depth is more than 80 m (the maximum depth which the pressure sensor 7 can measure). If so, the controller determines that a dangerous or abnormal dive was made to set "1" in the flag FK at step C11. At step C12 the controller 4 sets "1" as the flag KS4 to store as the classification of danger/abnormality the fact that the water depth is more than 80 m.

When the determination at step C10 is NO, or after step C12, control passes to step C13, where the controller 4 determines whether the dive time counted by the dive time counter 10 is more than the upper limit, for example, 300 minutes of a general dive time. If so, the controller determines that a dangerous or abnormal dive was made to set "1" in the flag FK at step C14. Then at step C15 the controller set "1" as the flag FS5 to store as the classification of danger/abnormality the fact that the dive time was more than 300 minutes.

Figure 4:
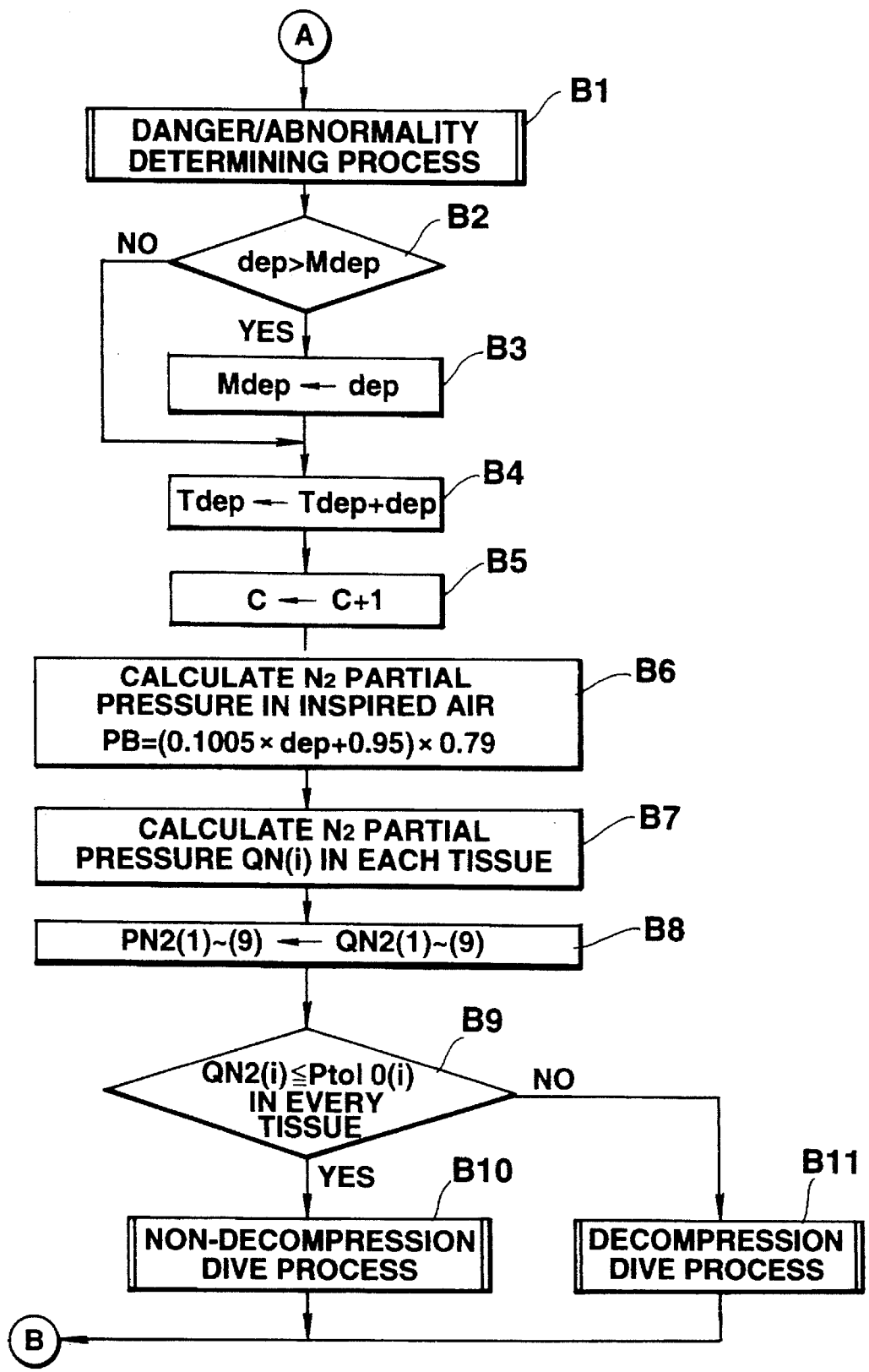
FIG. 4 is a flowchart continued from that of FIG. 3.

Control then returns to FIG. 4, where at step B2 the controller determines whether the current measured depth (data on which is stored in the register dep) is more than the maximum depth, data on which is stored in the register Mdep, after the danger/abnormality determining process at step B1.

When the controller determines that the depth, data on which is stored in the register dep, is more than the maximum depth, data on which is stored in the register Mdep, control passes to step B3, where the controller transfers data on the former depth as data on a maximum new depth to the register Mdep.

When the determination at step B2 is NO, or after step B3, control passes to step B4, where the controller adds data on the depth measured this time and stored in the register dep to the total depth data stored in the register Tdep, and stores data on the result of the addition in the register Tdep. That is, the depth measured this time is added to the total depth obtained so far.

At step B5 the controller adds "1" to the number of times of measurement, data on which is stored in the register C, and stores data on the result of the addition in the register C.

At step B6 the controller calculates a nitrogen partial pressure PB in the air inspired at this time from the following expression (1).

$$PB=(0.1005 \times dep+0.95) \times 0.79 [bar] \quad (1)$$

where dep is data on the depth.

After the calculation of the PB from the expression (1), at step B7 the controller calculates the nitrogen partial pressure QN2(i) in each of the tissues.

The calculation of the nitrogen partial pressure QN2(i) in each of the tissues at step B7 will be described with respect to a flowchart of FIG. 6.

Figure 6:
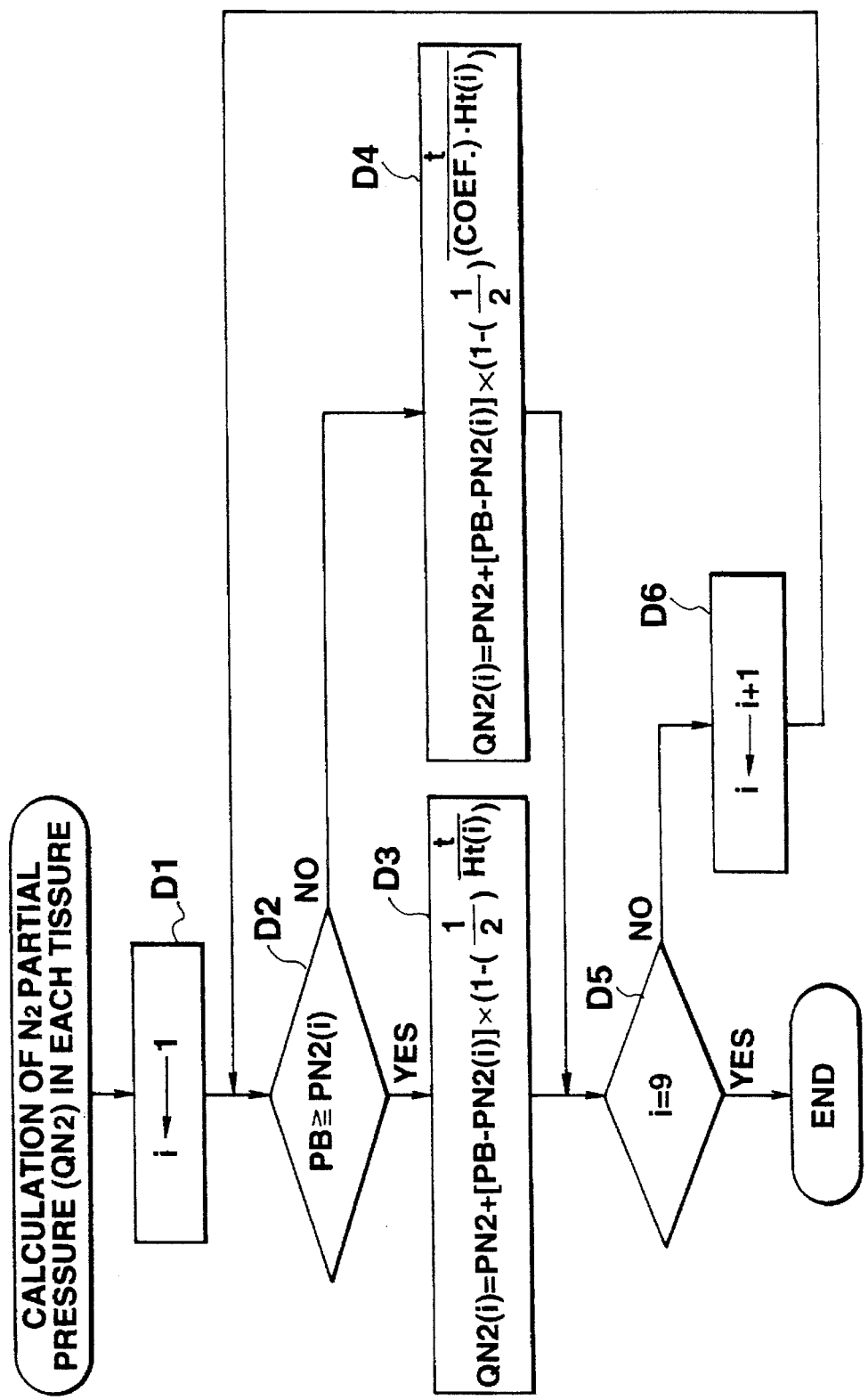
FIG. 6 is a flowchart indicative of the details of calculation of tissue nitrogen partial pressures at step B7 of the flowchart of FIG. 4.

First, at step D1 of FIG. 6 the controller sets "1" as the initial value in the register i to designate a first tissue. At step D2 the controller determines whether the nitrogen partial pressure (data on which is stored in the register PN2(i)) of the tissue (i) designated by the register i is less than the nitrogen partial pressure PB in the inspired air.

When the controller determines that PB≧PN2(i) in this determination or the nitrogen partial pressure PB of the inspired air is more than the current nitrogen partial pressure PN2(i) of the tissue (i) and nitrogen has been absorbed in the tissue (i), or both the nitrogen partial pressures are equal, control passes to step D3, where the controller calculates a new nitrogen partial pressure QN2(i) of the tissue (i) from the following expression:

$$QN2(i)=PN2(i)+[PB-PN2(i)] \times (1-0.5^{t/m}) \quad (2)$$

where m is Ht(i); t is the interval of time for the depth measurement; PN2(i) is the current nitrogen partial pressure in the tissue (i); QN2(i) is the nitrogen partial pressure in the tissue after the lapse of the amount of time t (in this embodiment, 3 seconds) since the current time; Ht(i) is a half saturation time which is required for the nitrogen partial pressure in the tissue (i) to decrease to 50% of its saturated value and the values of FIG. 7 are beforehand stored as the half saturation times for the respective tissues.

When PB<PN2(i) in the determination at step D2 of FIG. 6, the current nitrogen partial pressure PN2(i) of the tissue (i) is more than the nitrogen partial pressure PB in the inspired air and nitrogen is discharged from the tissue (i), control passes to step D4, where the controller calculates a new nitrogen partial pressure QN2(i) of the tissue (i) from the next expression:

$$QN2(i)=PN2(i)+[PB-PN2(i)] \times (1-0.5^{t/k}) \quad (3)$$

where k is the half saturation time Ht(i) of the tissue i × a discharge speed coefficient of FIG. 7. The discharge speed coefficient is used to correct the half saturation time at the discharge of nitrogen because the discharging speed of nitrogen of each of the tissues is low compared to the absorbing rate of the nitrogen, and the half saturation time at the discharge of the nitrogen is longer than the half saturation time at the absorption of the nitrogen. For example, as shown in FIG. 7, the half saturation time of the tissue (i) at the absorption of nitrogen is 2.5 minutes and the discharge speed coefficient is "3", so that the half saturation time of the tissue (1) at the discharge of the nitrogen is 7.5 minutes which is three times the half saturation time of the tissue (i) at the absorption of nitrogen. The half saturation time of the tissue (5) at the absorption of the nitrogen is 40 minutes and the discharge rate coefficient is "2". Thus, the half saturation time of the tissue (5) at the absorption of nitrogen is twice that at its absorption of nitrogen.

In this embodiment, data on the discharge rate coefficient is stored in a fixed manner in the ROM 14 and is read in correspondence to the tissue on the basis of its tissue number in the calculation of the expression (3).

Without being stored in a fixed manner in the ROM 14, data on the discharge rate coefficient may be stored in a data rewritable memory such as an EEPROM (Electrically Erasable Programmable Read Only Memory) such that any values may be written by a manual switch into the memory to thereby set an optimal value depending on the diver's body condition at the time of a dive.

After the tissue nitrogen partial pressure QN2(i) of the tissue i after a lapse of the time t since the current time is obtained at step D3 or D4 of FIG. 6, control passes to step D5, where the controller determines whether the value of the register i is "9". If not, control passes to step D6, where the controller increments the value of the register i by one. Control then returns to step D2.

Since "1" has been set in the register i in its initial state, the controller sets "2" in the register i at step D6, where the above process is performed for a second tissue (2) to calculate a new nitrogen partial pressure QN2(2) of the tissue (2). Thereafter, similarly, the controller calculates the nitrogen partial pressures QN2(i) in the third, fourth, . . . and ninth tissues in dependence on whether the respective tissues are absorbing or discharging nitrogen in accordance with expression (2) or (3).

When the respective nitrogen partial pressures QN2(i) of the tissues are obtained at step B7 of FIG. 4, the controller transfers to the registers PN2(1)–PN2(9) data on the nitrogen partial pressures of the respective tissues stored in the registers QN2(1)–QN2(9) after a lapse of an amount of time t since the current time at step B8. At step B9 the controller determines whether the nitrogen partial pressures QN2(i) of all the tissues are less than an allowable supersaturated nitrogen partial pressure Pto1O(i) at the depth of "O m".

The allowable supersaturated nitrogen partial pressure (or the difference between the environmental pressure and the body nitrogen partial pressure) for each of the tissues has a limit. If a change in the environmental pressure (at the time of rising) is rapid and large, the nitrogen partial pressure would exceed an allowable range of supersaturated nitrogen partial pressure and the diver would suffer from a so-called decompression illness. Let the supersaturated nitrogen partial pressure allowable in an environmental pressure be Pamb.tol. In order to avoid the decompression illness, the nitrogen partial pressure of the tissue at the end of the decompression must be less than a pressure Ptol(i) which is the sum of the environmental pressure at the next decompression depth and the Pamb.tol, which is thereafter referred to as an allowable supersaturated nitrogen partial pressure (absolute pressure). This value is the one inherent in each tissue and thus varies from tissue to tissue.

FIG. 8 shows an allowable supersaturated nitrogen partial pressure Ptol(i) of each of the tissues at a respective one of the depths. For example, in a tissue (1) whose half saturation time Ht(1)=2.5 minutes, the allowable supersaturated nitrogen partial pressure Pto10(1) is 2.90 [bar] at the depth of 0 m; and it is 3.45 [bar] at a depth of 3.0 m.

If the nitrogen partial pressures QN2(i) in all the tissues are less than the corresponding allowable supersaturated nitrogen partial pressures Pto10 (i) at the depth of 0 m at step B9 of FIG. 4, no decompression is required. Thus, the controller performs non-decompression dive process at step B10. If there is at least one tissue whose nitrogen partial pressure QN2(i) is larger than the corresponding allowable supersaturated nitrogen partial pressure Pto10(i) at the depth of 0 m, decompression is required. Thus, the controller performs a decompression dive process at step B11.

For example, for a tissue of Ht(1) in FIG. 8, if the tissue nitrogen partial pressure QN2(i) is less than 2.9 [bar], the diver can rise without decompression while if the tissue nitrogen partial pressure QN2(1) is in a range of 3.45–4.00 [bar], the diver must stop or stay for decompression at a depth of 6 m.

The non-decompression dive process at step B10 of FIG. 4 will be described below with respect to a flowchart of FIG. 9.

Figure 9:
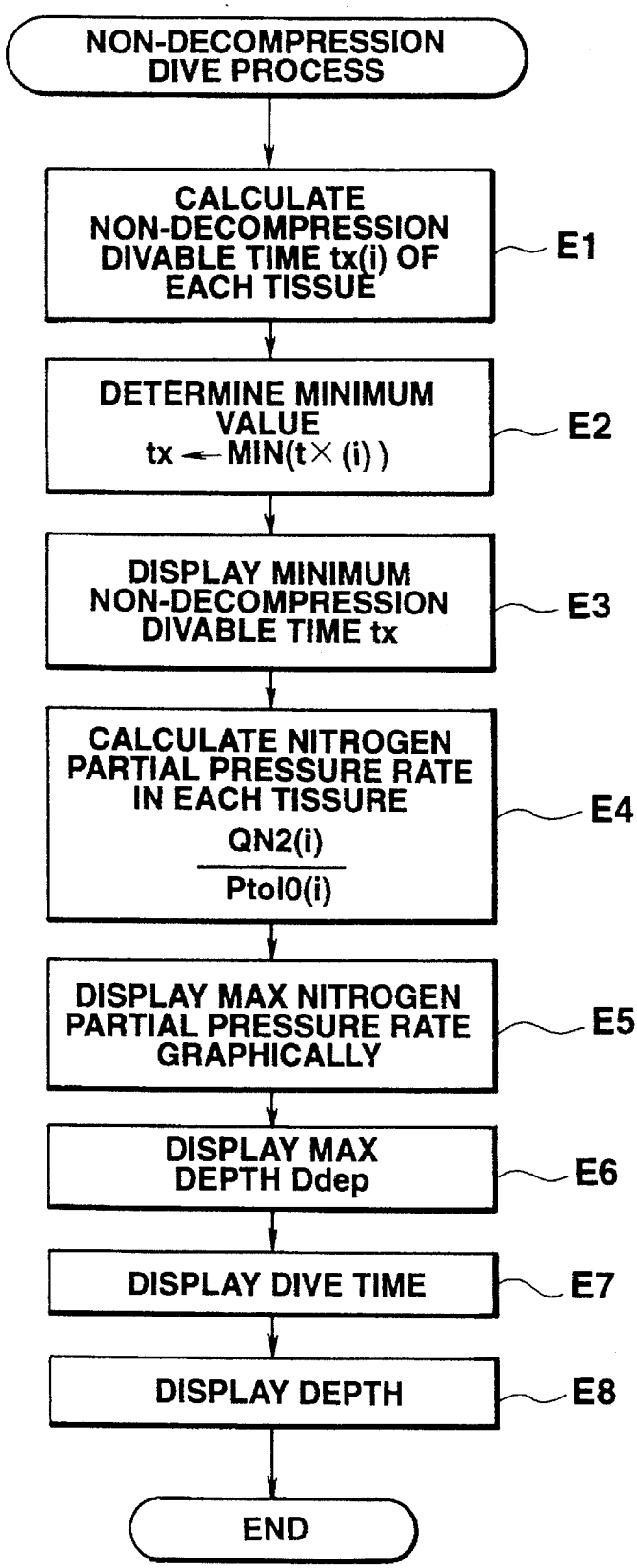
FIG. 9 is a flowchart indicative of the details of a non-decompression dive process of the flowchart of FIG. 4.

At step E1 of FIG. 9 the controller calculates a non-decompression divable time tx(i) of each of the tissues. The following equation is obtained by solving an arithmetic expression for the nitrogen partial pressure QN2(i) of each of the tissues at the non-decompression limit (QN2(i)=Pto10(i)) with respect to tx(i):

$$tx(i) = -Ht(i) \times [ln(1-f)]/ln2 \qquad (4)$$

where $f=(Pto10(i)-PN2(i))/(PB-PN2(i))$.

The controller calculates the non-decompression divable times tx(i) of the respective tissues (1)–(9) from the expression (4) and stores data on the tx(i) in the registers tx(1)–tx(9). At step E2 the controller stores the minimum value of the non-decompression divable times tx(i) of the respective tissues as the minimum non-decompression divable time in the register tx. At step E3 the controller displays the minimum non-decompression divable time tx on the display 17.

At step E4 the controller divides the respective nitrogen partial pressures QN2(i) of the tissues by the corresponding allowable supersaturated nitrogen partial pressures Pto10 at the depth of 0 m to obtain the percentages of the nitrogen partial pressures of the respective tissues in the allowable supersaturated nitrogen partial pressure (QN2(i)/Pto10 [%]) at the depth of 0 m. At step E5 the controller displays the maximum value of the nitrogen partial pressure percentages of the respective tissues graphically and also displays the maximum depth, data on which is stored in the register Mdep, at step E6. The controller also displays the dive time counted by the dive time counter 10 at step E7 and displays the measured depth, data on which is stored in the register dep at step E8.

One example of the display state of data at the non-decompression dive will be described with respect to FIG. 10A, which displays the state where the current depth is "23.4 m", the maximum depth is "30.8 m", the dive time is "21 min", and the minimum non-decompression divable time is "6 min". Eight display segments are provided at an lower left portion of the display 17 to display the maximum value of the percentage of the tissue nitrogen partial pressure QN2(i) in the supersaturated nitrogen partial pressure Pto10 at the depth of 0 m graphically in eight steps.

For example, when QN2(i)/Pto10[%] is 20–40%, one display segment is lighted up; when it is 40–50%, two display segments are lighted up; when it is 50–60%, three display segments are lighted up; when it is 60–70% four display segments are lighted up; when it is 70–80%, five display segments are lighted up; when it is 80–90%, six display segments are lighted up; when it is 90–100%, seven display segments are lighted up; and when it is more 100%, all the eight display segments are lighted up. Thus, the diver can know from those display segments the percentage of the tissue nitrogen partial pressure QN2(i) in the allowable supersaturated nitrogen partial pressure Pto10 at the depth of 0 m.

Figure 11:
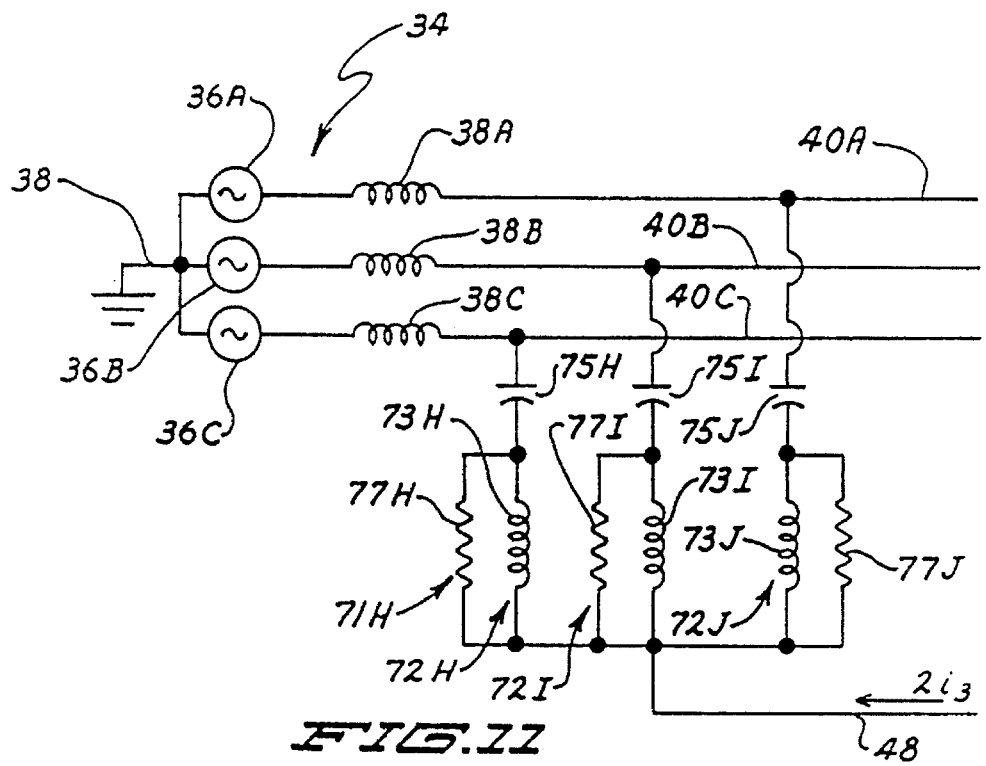
FIG. 11 is a flowchart indicative of the details of a decompression dive process of the flowchart of FIG. 4.

The decompression dive process at step B11 of FIG. 4 will be described next with respect to a flowchart of FIG. 11. The controller sets an initial value "1" in the register i which designates a tissue at step F1 of FIG. 11. At step F2 the controller determines whether the nitrogen partial pressure QN2(i) of the tissue (i) (in this case, the tissue (1)) designated by the register i at step F2 is higher than the allowable supersaturated nitrogen partial pressure Pto10(i) of the tissue (i) at the depth of 0 m.

If so, at step F3 the controller sets "3m" as an initial value in the register SD(i) indicative of the compression depth of the tissue (i). At step F4 the controller determines whether the nitrogen partial pressure QN2(i) of the tissue (i) is less than the allowable supersaturated nitrogen partial pressure Ptol(i) of the tissue (i) at the depth of 3 m. If so, control passes to step F5, where the controller calculates a decompression time ty(i) at the depth of 3 m from the next expression:

$$ty(i) = -Ht(i) \times (\text{coefficient}) \times [ln(1-f)]/ln2 \qquad (5)$$

where $f=[Pto10(i)-PN2(i)]/(PBs-PN2(i))$, PBs is the nitrogen partial pressure in the inspired air at the decompression depth and the coefficient is a discharge rate coefficient.

The controller calculates the decompression time ty(i) of the tissue (i) and stores data on the result of the calculation in the register ty(i).

When the nitrogen pressure QN2(i) of the tissue (i) is higher than the allowable supersaturated nitrogen partial pressure Ptol(i) at the depth of 3 m in the determination at step F4, control passes to step F6, where the controller sets data on the sum of the decompression depth SD(i) at the time and 3 m as a new decompression depth SD(i) in the register SD(i). At step F7 the controller determines whether the decompression depth SD(i) has exceeded 12 m. If not, control returns to step F4, where the controller calculates an allowable supersaturated nitrogen partial pressure Ptol(i) at a new decompression depth SD(i) and determines whether the nitrogen partial pressure QN2(i) of the tissue (i) is less than the allowable supersaturated nitrogen partial pressure Ptol(i) (in this case, at the depth of 6 m).

As the result of this determination, if the nitrogen partial pressure QN2(i) of the tissue (i) is less than its allowable supersaturated nitrogen partial pressure Ptol(i) at the depth of 6 m (YES at step F4), control passes to F5, where the controller calculates the decompression time. If the nitrogen partial pressure QN2(i) of the tissue (i) is higher than its allowable supersaturated nitrogen partial pressure Ptol(i) at the depth of 6 m at step F4, the controller sets depths of 9 and 12 m as decompression ones to thereby perform a similar operation.

When the decompression depth exceeds 12 m in the determination at step F7, the controller regards this determination as erroneous and displays it on the display 17 at step F8.

When the calculation of the decompression time for one tissue (i) is completed in a manner mentioned above, control passes to step F9, where the controller determines whether the value of the register i is "9". If not, control passes to step F10, where the controller increments the value of the register i by one and designates the next tissue. Control then returns to step F2. Thereafter, similarly, the controller determines whether the nitrogen partial pressure QN2(i+1) of the next tissue (i +1)(in this case, the tissue (2)) is higher than its allowable supersaturated nitrogen partial pressure Pto10(i+1) at the depth of 0 m. If so, the controller sets 3 m as the depression depth SD(i+1) and iterates a similar process, as mentioned above.

When the nitrogen partial pressures QN2(i) of all the tissues are less than their allowable supersaturated nitrogen partial pressures Ptol(i) at the respective decompression depths in this way, control passes to step F11, where the controller stores data on the maximum value of the decompression depths SD(i) of the respective tissues, data on which is stored in the registers SD(1)–SD(9), as the maximum decompression depth in the register SD.

At step F12 the controller obtains the decompression time of the tissue having the maximum decompression depth from the data in the register tx(i) and stores data on that decompression time as the maximum value of the decompression time in the register ty. At this time, when there are a plurality of maximum decompression depths, the controller checks the decompression time of each of the tissues having the maximum decompression depth among data in the registers tx(1)–tx(9) and stores data on the maximum value of those decompression times as the maximum decompression time in the register ty. Thereafter, at step F13 the controller displays on the display 17 data on the maximum decompression depth in the register SD and the maximum decompression time in the register ty. The controller displays on the display 17 the depth, data on which is stored in the register dep at step F14, and also displays the maximum depth, data on which is stored in the register Mdep at step F15. At step F16 the controller displays on the display 17 the dive time counted by the dive time counter 10. In this case, there is a tissue whose nitrogen partial pressure QN2(i) is higher than its allowable supersaturated nitrogen partial pressure Ptol(i) of that tissue at the depth of 0 m and QN2(i)/Ptol(i) [%]>100 [%]. Thus, the controller lights up all the eight display segments of the display 17 which displays the percentage of the nitrogen partial pressure at step F17.

One example of the display state of data at the decompression dive will be described with respect to FIG. 10B, which shows the current depth is "18.6 m", the maximum depth is "30.8 m", the dive time is "52 minutes", the decompression depth is "3 m" and the decompression time at that depth is "2 minutes". In this case, the controller lights up all the eight display segments to indicate that the tissue nitrogen partial pressure QN2(i) has exceeded its allowable supersaturated nitrogen partial pressure Ptol(i) at the depth of 0 m. Thus, the diver can know from that display that decompression is required for two minutes at the depth of 3 m in order to rise to the surface.

Referring back to FIG. 3, when the controller determines that the current depth is less than 1 m at step A5, it determines whether the flag FS is "1" at step A16. If so, it implies that the depth is more than 1 m and the diver started to dive and then rose to a depth less than 1 m. In this case, the controller determines that the dive has been ended and sets "0" in the flag FS at step A17 and resets the flip-flop 11 at step A18 to thereby stop the measurement of the dive time by the dive time counter 10.

At step A19 the controller stores data on the current time as the dive finish time at the dive finish time storage location of the log book data storage RM1. At step A20 the controller stores data on the maximum depth measured at the current dive and stored in the register Mdep at the maximum depth storage location of the log book data storage RM1. At step A21 the controller stores data on the result of the counting by the dive time counter 10 as a dive time at the dive time storage location of the log book data storage RM1. At step A22 the controller calculates an average depth from data on the total depth stored in the register Tdep and data on the number of times of depth measurement in the register C and stores data on the average depth at the average depth storage location of the log book data storage RM1 at step A23.

Thereafter, at step A24 the controller determines whether the flag FK is "1" or a dangerous or abnormal dive has been made. If so, at step A25 the controller stores data in the registers KS1–KS5 in the danger/abnormality data storage location of the log book data storage RM1.

At step A26 the controller sequentially shifts data stored in the first through ninth storage locations KM1–KM9 of the danger/abnormality data storages KM1–KM9 to its second through tenth storage locations KM2–KM10. Since a dive made this time was dangerous or abnormal, at step A27 the controller transfers the data in the log book data storage RM1 to the danger/abnormality dive data storage KM1 to store the dive data measured this time. Thereafter, at step A28 the controller set "0" in the flag FK to clear data in the registers KS1–KS5.

At those process steps, the controller stores data items on the time, maximum depth, dive time, and average depth at the depth of less than 1 m in the log book data storage RM1. If the dive was dangerous or abnormal, the controller transfers and stores the dive data stored in the log book data storage RM1 to and in the danger/abnormality dive data storage KM1.

At step A29 after step A28 the controller determines whether the depth less than 1 m continued for more than 10 minutes. If so, the controller changes the measuring mode from the depth measuring mode to a horizontal recess time measuring mode.

Figure 12:
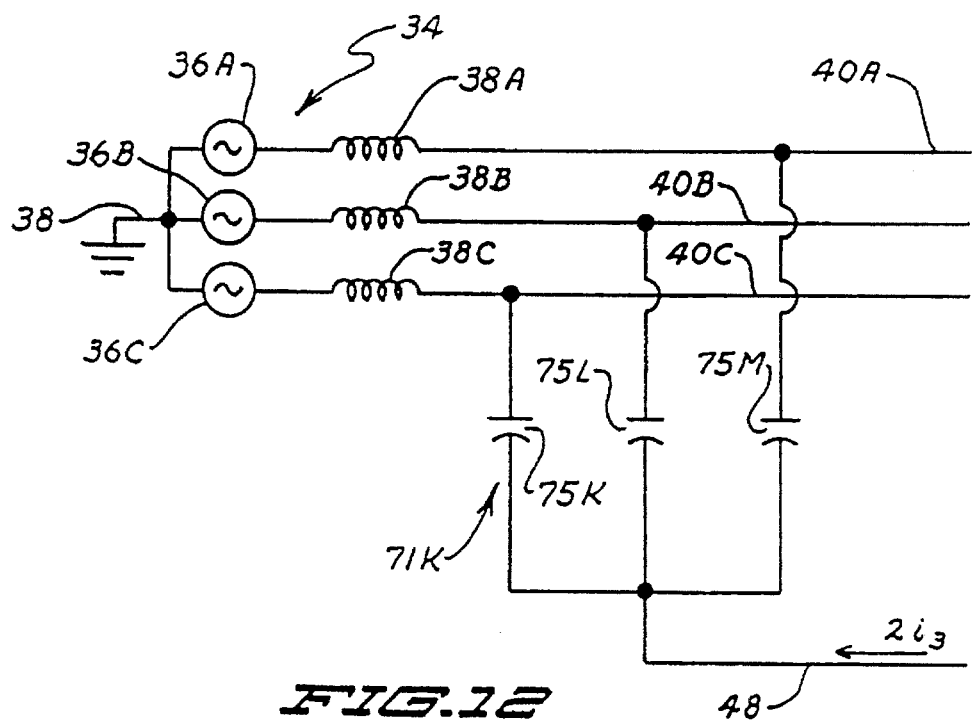
FIG. 12 shows a displayed example of data produced in a decompression dive.
Figure 12:
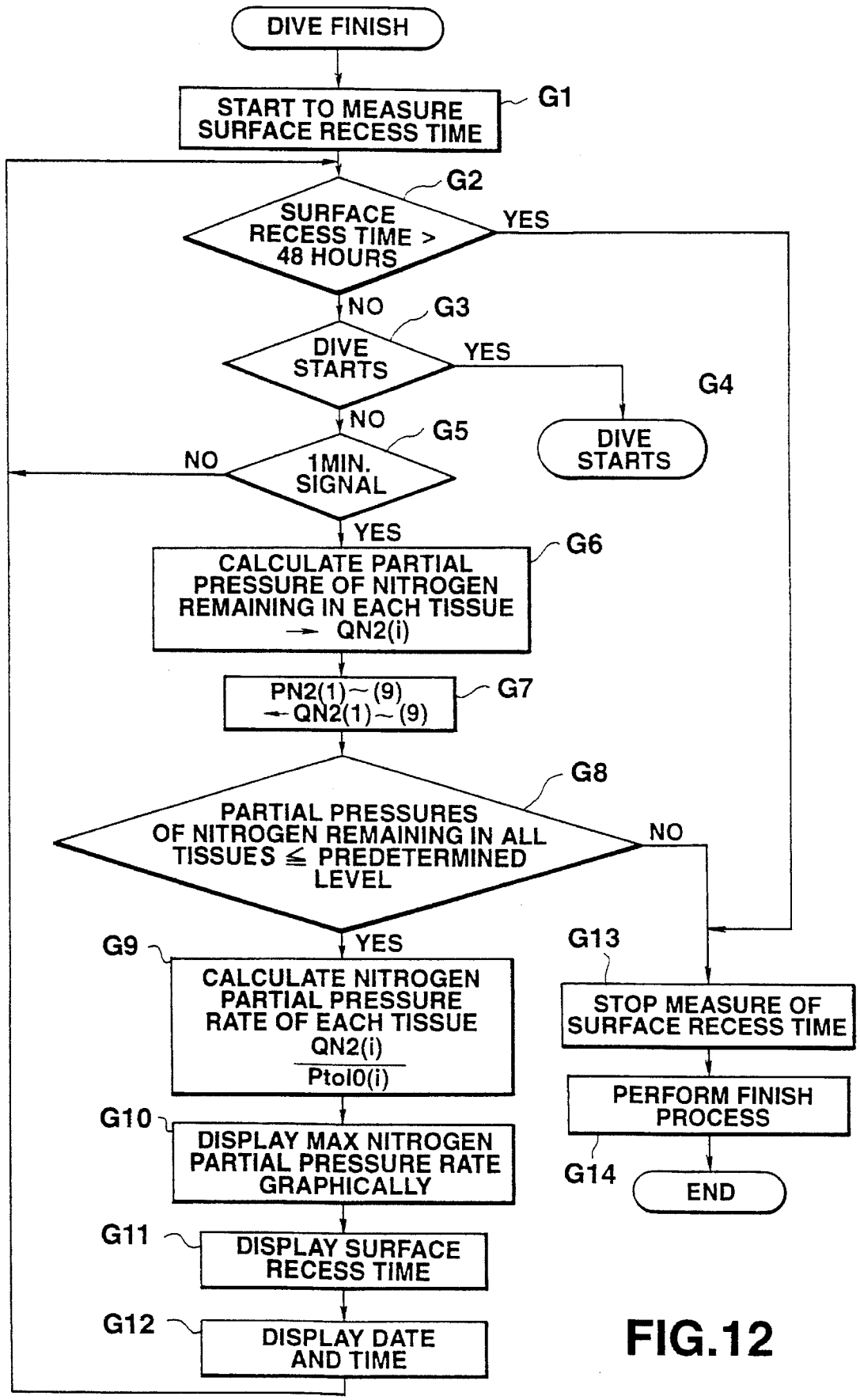

The controller then performs a dive finish process, which will be described with respect to a flowchart of FIG. 12. At step G1 of FIG. 12 the controller sets the flip-flop 13 to start the measurement of the surface recess time by the surface recess time counter 12. At the next step G2 the controller determines whether the measured time in the counter 12 has exceeded 48 hours. If not, control passes to step G3, where the controller determines whether the depth measurement mode has been employed at present. If so, control passes step G4, where the controller performs the dive starting process of FIG. 4.

When the controller determines at step G3 that the depth measurement mode has not been employed at present, the controller determines at step G5 whether a 1-minute signal has been detected. If so, control passes to step G6, where the controller calculates the remaining nitrogen partial pressures QN2(i) in the respective tissues from the following expression:

$$QN2(i) = PN2(i) + (PB0 - PN2(i)) \times (1 - 0.5^{t/k}) \quad (6)$$

where k=discharge rate coefficient x Ht(i), and PB0 is the nitrogen partial pressure in the inspired air at the depth of 0 m.

When the controller calculates the remaining nitrogen partial pressures QN2(i) in the respective tissues from the above expression, it stores data items on those pressures in the registers QN2(1)–QN2(9). At step G7 the controller transfers data in the registers QN2(1)–QN2(9) to the corresponding registers PN2(1)–PN2(9).

At step G8 the controller determines whether the remaining nitrogen partial pressures in all the tissues are less than a predetermined level, which is a tissue remaining nitrogen partial pressure Pde(i) below which discharge of the nitrogen remaining in each of the tissues of FIG. 13 is regarded as completed.

At step G8, when the remaining nitrogen partial pressures in the respective tissues (i) are more than the value of Pde(i) of FIG. 13, control passes to step G9, where the controller calculates the percentages of the nitrogen partial pressures QN2(i) of the respective tissues (i) in their allowable supersaturated nitrogen partial pressures Pto10(i) at the depth of 0 m.

The controller obtains the maximum value of the percentages of the nitrogen partial pressures QN2(i) of the respective tissues in the allowable supersaturated nitrogen partial pressure Pto10(i) at the depth of 0 m and displays that maximum value graphically on the display 17, using the eight lighted or unlighted display segments. At step G11 the controller displays on the display 17 the measured time in the surface recess time counter 12 as the surface recess time. At step G12 the controller displays the current date and time on the display 17.

At step G8 when the controller determines that the remaining nitrogen partial pressures in all the tissues are less than the predetermined level or that the surface recess time has exceeded 48 hours at step G2, control passes to step G13, where the controller stops the measurement of the time by the surface recess time counter 12 and performs the finishing process at step G14 to terminate the process.

One example of the display state at the measurement of the surface recess time will be described with respect to FIG. 10C. At this time, the controller displays on the display 17 a surface time mark "SURF.TIME" indicating that the surface recess time is being measured, the surface recess time "2 h 08 min" at that time, the date "8-31" and the current time "13:48".

A log book data reading process performed when the dive finished and the log book mode has been selected will be described with respect to a flowchart of FIG. 14.

Figure 14:
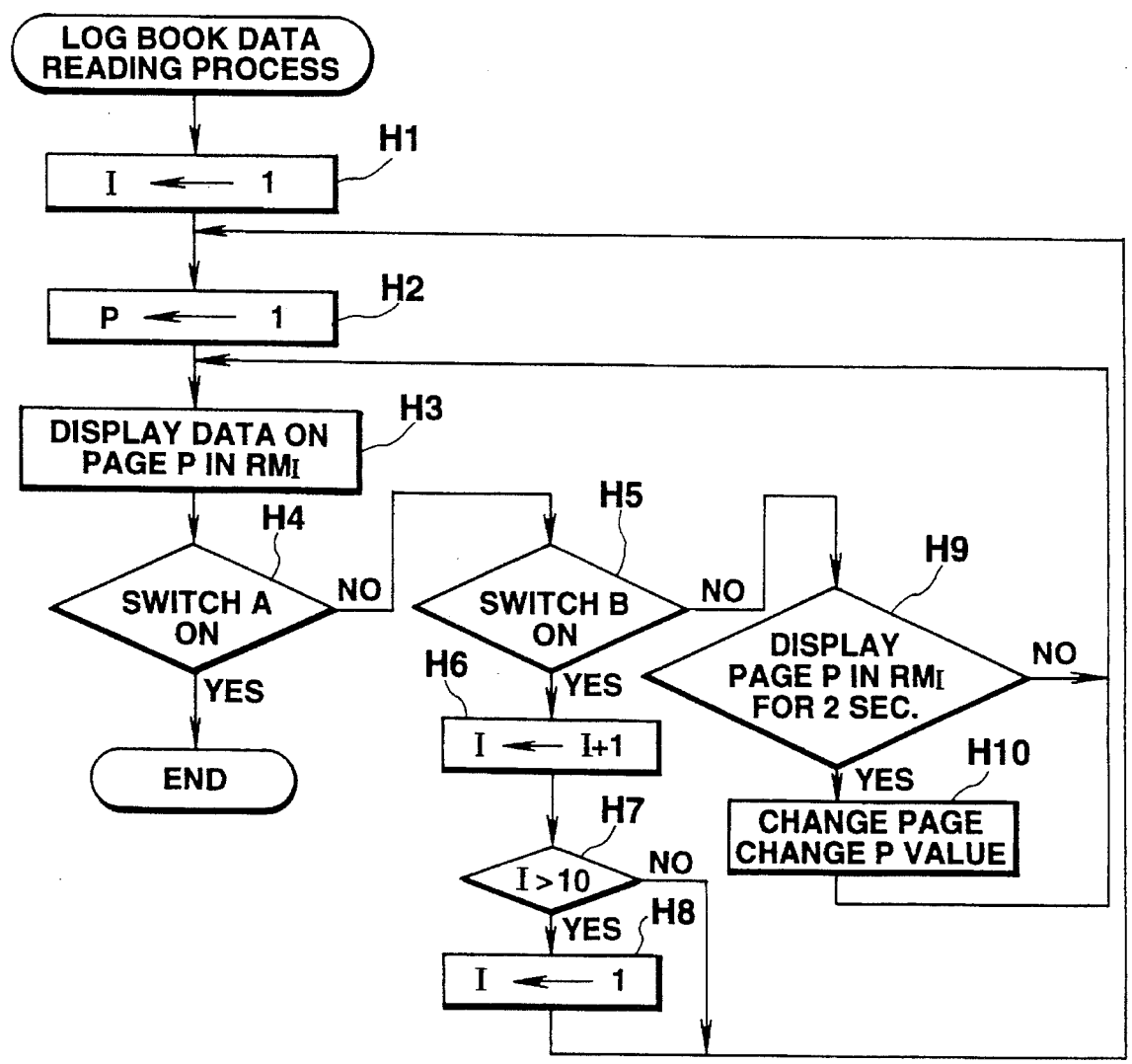
FIG. 14 is a flowchart indicative of a process for reading log book data in the decompression data display device of FIG. 1.

At step H1 of FIG. 14 the controller sets "1" as the initial value of the pointer I which designates data in that of the log book data storages RM(1)–RM(10) to be read. At step H2 the controller sets "1" as the initial value of the page pointer P which designates a page to be read in the log book data storage RMI designated by the pointer I. The controller reads dive data on page P (in this case, page 1) in the log book data storage RMI (in the initial state, the first log book data storage RM1) designated by the pointer I and displays it on the display 17.

At step H4 the controller determines whether the read ending switch A has been operated. If not, control passes to step H5, where the controller determines whether the switch B has been operated. If so, at step H6, the controller increments the value of the pointer I by "1".

At step H7 the controller determines whether the value of the pointer I is larger than "10". If not, control returns to step H2, where the controller sets "1" in the page pointer P and displays on the display 17 the dive data in the log book data storage RMI designated by the pointer I. When the value of the pointer I is larger than "10" at step H7, reading the tenth dive data in the log book data storages RM1–RM10 has been completed and the next memory area has been designated. Thus, the controller sets "1" in the pointer I at step H8 to return the value of the pointer I to its initial value.

When the controller determines at step H5 that the switch B has not been operated, control passes to step H9, where the controller determines whether the dive data on the page P in the log book data storage RMI has been displayed for two seconds. If so, control passes to step H10, where the controller changes the value of the pointer P from the "1" to "2" or vice versa. Control then returns to step H3, where the controller displays on the display the dive data on the page designated by the pointer P.

When the switch B is operated in the log book mode, the controller sequentially displays the dive data items stored in the log book data storage RMI, starting with the first dive data item, and displays data items on the first and second pages in the log book data storage RMI alternately at intervals of two seconds.

Figure 15:
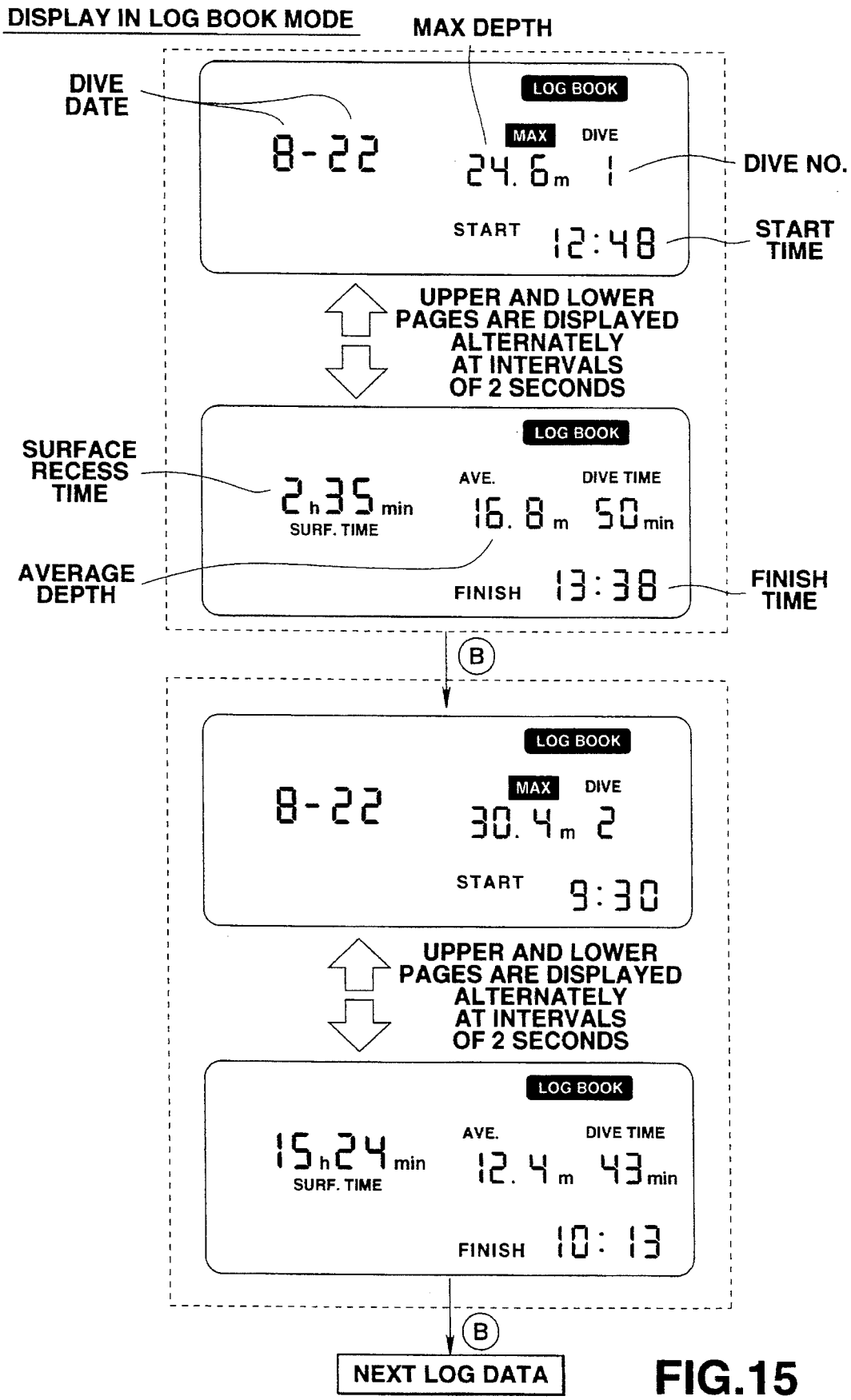
FIG. 15 shows an illustrative display example of read log book data.

One example of the display state in the log book mode will be described with respect to FIG. 15. In the log book mode, the controller alternately displays dive data items on the first and second pages in the first log book data storage RM1 alternately on the display 17. In this case, as shown in FIG. 15(a), the controller displays the dive date "8-22", the maximum depth "24.6 m", the dive number "1", the dive start time "12:48" on page 1, and the surface recess time "2 h 35 min", the average depth "16.8 m", the dive time "50 min", the dive finish time "13:38" on page 2 alternately at intervals of seconds.

When the switch B is operated in a state where the dive data item in the first storage RM1 of the log book data storage RMI is displayed (FIG. 15(a)), dive data items on pages 1 and 2 in the second storage RM2 of the log book data storage RMI are displayed alternately. Thereafter, each time the switch B is operated, dive data items in the third, fourth, ... storage RM3, RM4 ... are displayed sequentially.

A process in the dangerous/abnormal dive data display mode will be described with respect to a flowchart of FIG. 16.

Figure 16:
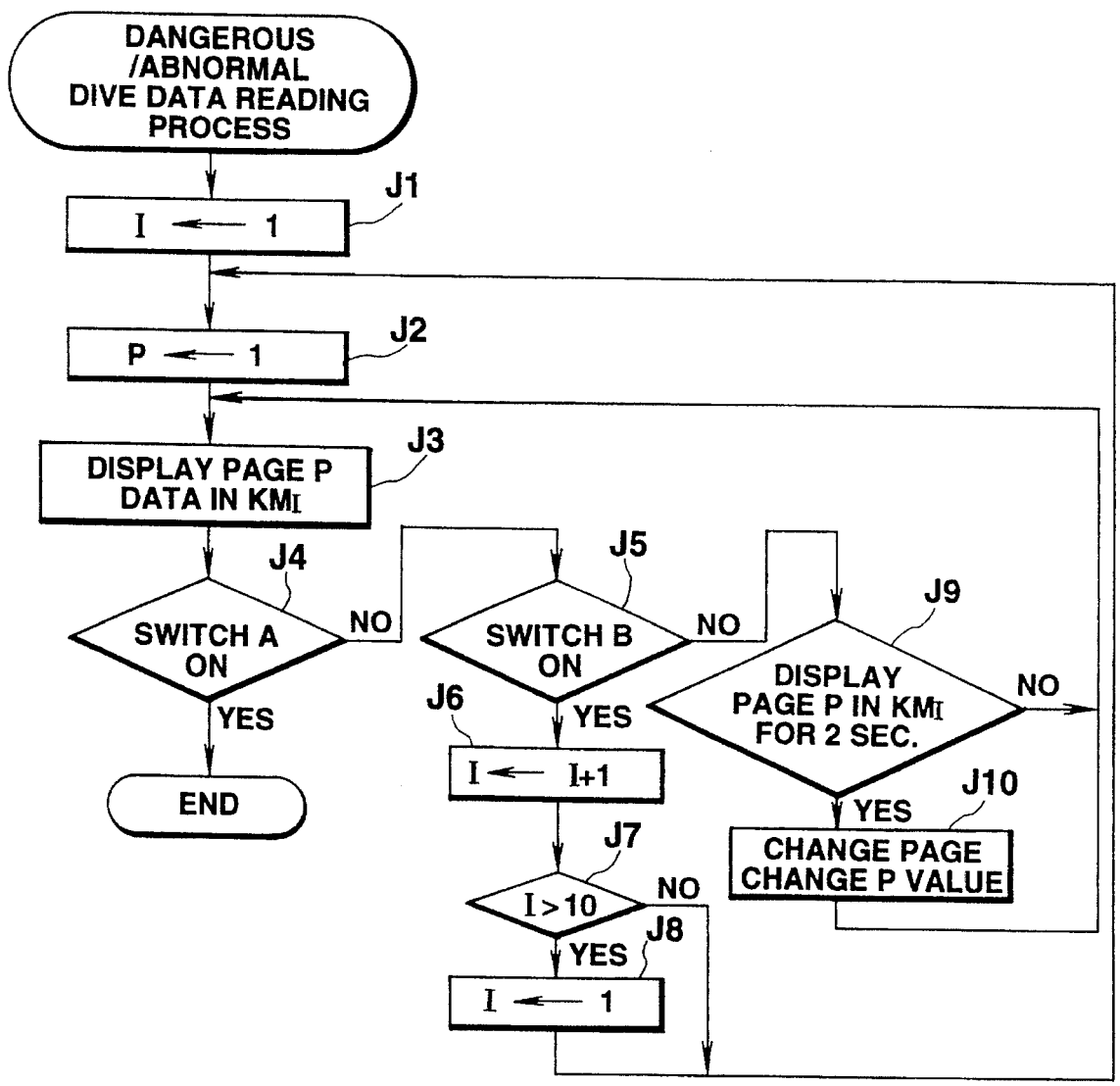
FIG. 16 is a flowchart indicative of a process for reading danger/abnormality data in the decompression data display device of FIG. 1.

At step J1 of FIG. 16 the controller sets "1" as an initial value in the pointer I. At step J2 the controller sets "1" as an initial value in the pointer P which designates a page. At step J3 the controller displays on the display 17 dive data on a page P (in this case, page 1) in the dangerous/abnormal dive data storage KMI (in this case, the first storage) designated by the pointer I.

At step J4 the controller determines whether the read ending switch A has been operated. If not, control passes to step J5, where the controller determines whether the switch B has been operated. If so, control passes to step J6, where the controller increments the value of the pointer I by one. Thereafter, the controller determines whether the value of the pointer I is larger than "10". If not, control returns to step J2. When the controller determines that the value of the pointer I is larger than "10 at step J7, the controller sets an initial value "1" in the pointer I because the value of the pointer I has changed to the next one incremented after reading the tenth dangerous/abnormal dive item in the dangerous/abnormal dive data storage KMI has ended. Control then returns to step J2.

At step J5 when the controller determines that the switch B has not been operated, control passes to step J9, where the controller determines whether the dive data on page P in the Ith dangerous/abnormal dive data storage KMI has been displayed for two seconds. If so, at the next step J10 the controller changes the value of the pointer P from "1" to "2"

or vice versa and control returns to step J3. Thereafter, at step H3 the controller displays dive data on a page designated by the pointer P.

That is, when the switch B is operated in the dangerous/abnormal dive data display mode, the controller displays dive data items stored in the dangerous/abnormal dive data storage KM1–KM10 obtained at the occurrence of a danger or abnormality, starting with the first dive data item, and displays the data items on the first and second pages in the dangerous/abnormal dive data storage KMI alternately at intervals of two seconds.

One example of the display state of the dangerous/abnormal dive data will be described with respect to FIG. 17. FIG. 17A displays a display state where the dive data stored in the first one of the dangerous/abnormal dive data storage KM1–KM10 was present when the rising speed was too high. In this case, the controller lights up and displays a mark "SLOW" indicating that the rising speed was too high as the classification of danger/abnormality; and also displays a dive date "8-22", maximum depth "24.6 m", dive number "1" and dive start time "12:48" on the first page and a surface recess time "2 h 35 min", average depth "16.8 m", dive time "50 min" and dive finish time "13:38" on a second page alternately at intervals of two seconds.

FIG. 17B shows the display state in which the dive data stored in the first one of the dangerous/abnormal dive data storage KMI was present when stay or stop for decompression was ignored. In this case, the controller lights up and displays marks "DECO" and "STOP" indicative of a dive made by ignoring a stop or stay for decompression as the classification of a danger/abnormality in a going on/off manner at periods of 2 Hz, and also displays a dive date "8-22", maximum depth "24.6 m", dive number "1" and dive start time "12:48" on the first page; and a surface recess time "2 h 35 min", average depth "16.8 m", dive time "50 min" and dive finish time "13:38" on a second page alternately at intervals of two seconds.

As described above, when a dangerous/abnormal dive is made, the controller stores data on the classification of a danger/abnormality and the dive data at that time in the dangerous/abnormal dive data storages KM1–KM10. Thus, the diver can know the conditions under which he made a dangerous or abnormal dive from those dive data items to thereby use those data items for reference to prevent a possible dangerous or abnormal dive beforehand. In this case, since the dangerous/abnormal dive data storages KM1–KM10 are provided separate from the log book data storages RM1–RM10 which store normal dive data, dive data obtained at the occurrence of a danger/abnormality are held preferentially without being erased even when ten or more dives were made and corresponding dive data items were obtained.

A dive plan mode process in which the diver sets an expected dive depth to display a non-decompression divable time at that depth will be described with respect to a flowchart of FIG. 18. In this dive plan mode, the controller beforehand calculates and displays cyclically a water depth which the user has set and non-decompression divable time for which the diver stays at depths increased sequentially at intervals of 3 m from that set depth.

Figure 18:
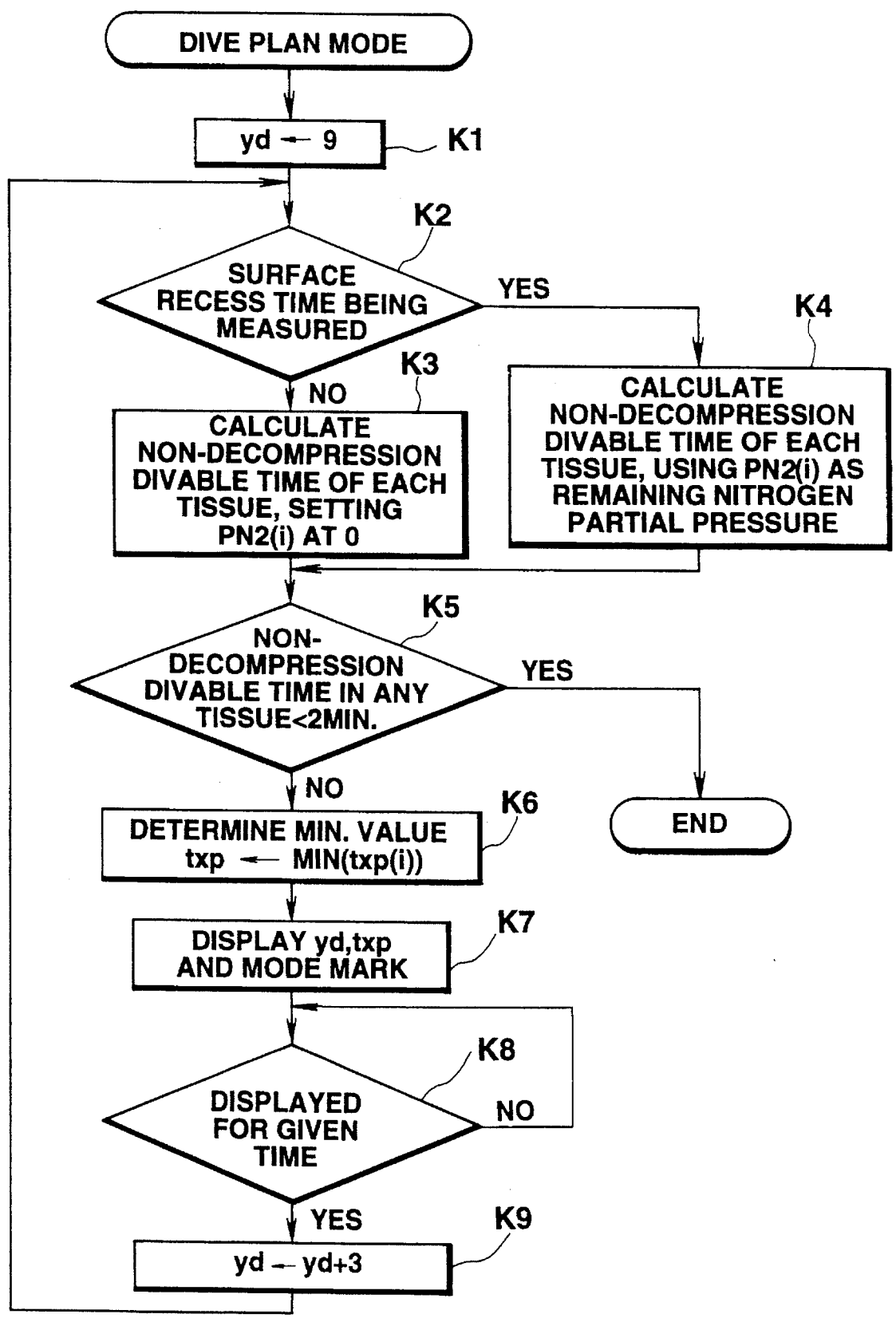
FIG. 18 is a flowchart indicative of a dive plan mode process in the decompression data display device of FIG. 1.

First, the controller sets "9 m" as an expected dive depth to set data on this depth in the register yd at step K1 of FIG. 18. At step K2 the controller determines whether the surface recess time is being measured or the tissue nitrogen is being discharged. If not, control passes to step K3, where the controller sets "0" in the values of the data on the respective tissue nitrogen partial pressures stored in the registers PN2(1)–PN2(9), calculates the respective non-decompression divable times of the tissues, and stores the result of the calculation in the registers txp(1)–txp(9).

The non-decompression divable time txp(i) in the dive plan mode may be calculated from the following expression:

$$txp(i)=-Ht(i)\times[ln(1-f)]/ln2 \quad (8)$$

where $f=(Pto10(i)-PN2(i))/(PB-PN2(i))$, and PB is the nitrogen partial pressure in the inspired air at an expected dive depth.

At step K2 when the controller determines that the surface recess time is being measured, control passes to step K4, where the controller calculates the non-decompression divable times from the nitrogen partial pressures of the respective tissues, data items on which are stored in the registers PN(1)–PN(9), and stores data on the obtained non-decompression divable times in the registers txp(1)–txp(9).

When the controller has obtained the non-decompression divable times of the respective tissues, it determines at step K5 whether there is any tissue having a non-decompression divable time of less than 2 minutes. If so, the controller terminates the dive plan mode process at that time.

When non-decompression divable times of the respective tissues are more than 2 minutes, control passes to step K6, where the controller determines the minimum value of the non-decompression divable times txp(i) of the respective tissues and stores data on that minimum value as the minimum non-decompression time in the register txp. At step K7 the controller displays on the display 17 data on the expected dive depth in the register yd, data on the minimum non-decompression divable time in the register txp and a mode mark indicative of the operational mode at that time.

At step K8 the controller determines whether those data items have been displayed for a given time. If so, at step K9 the controller adds 3 m to the data value in the register yd and sets a new depth which has increased by 3 m as an expected depth in the register yd. Control then returns to step K2, where the controller iterates the above process to calculate the non-decompression divable times of the respective tissues at that depth which has increased by 3 m and to display the non-decompression divable times.

Figure 19:
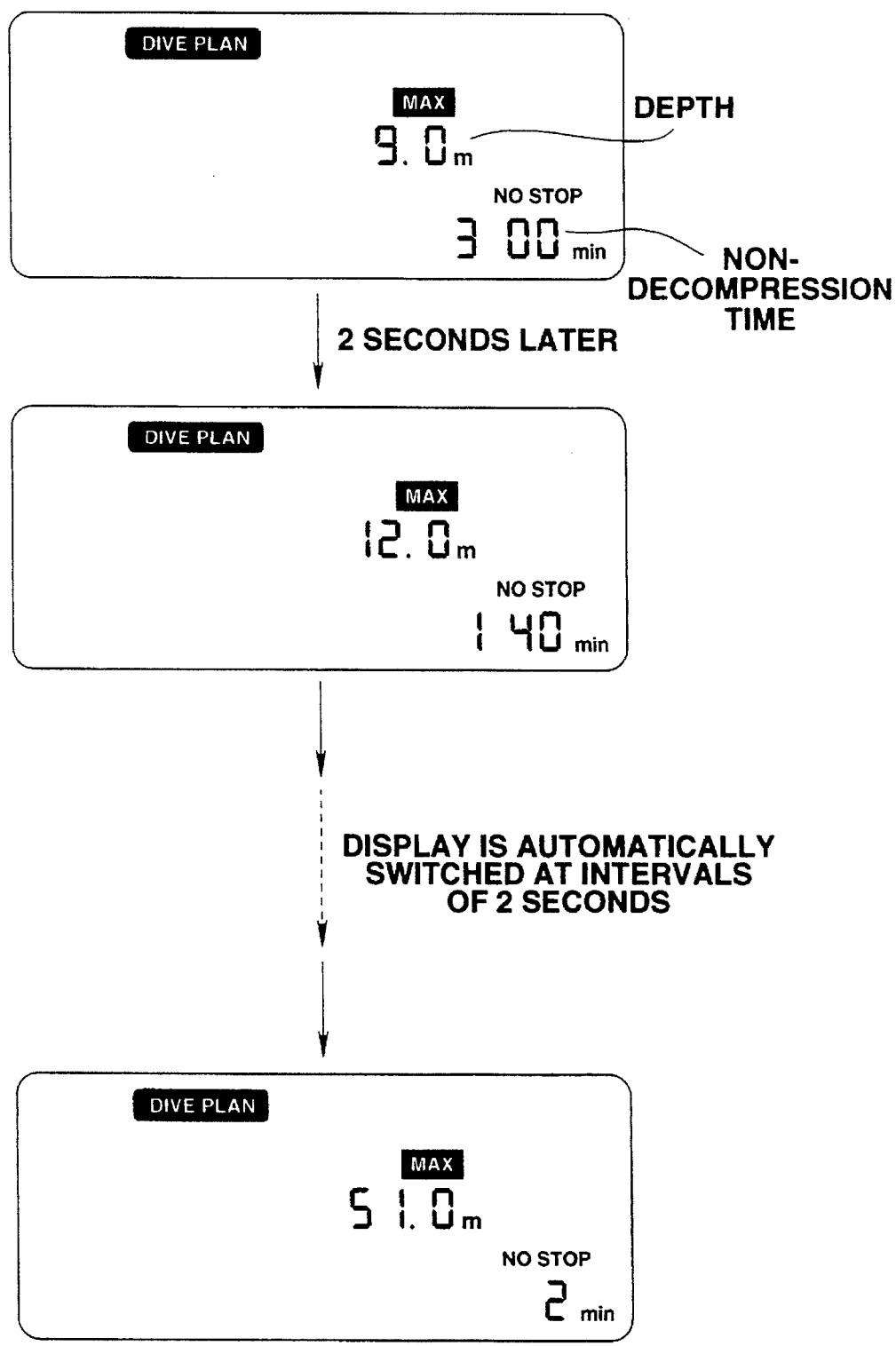
FIG. 19 shows a display example of the dive plan mode.

FIG. 19 shows one example of a display state in the dive plan mode in which "9.0 m" is set as an expected depth when the current dive is the first one and the remaining nitrogen pressures are "0".

At this time, "300 min" is first displayed as the non-decompression divable time at the depth of "9 m" on the display 17. When two seconds has elapsed, the controller displays a non-decompression divable time "140 minutes" at a depth of "9 m" which is the sum of the last depth and "3 m". The non-decompression divable times at the respective depths which increase at the interval of "3 m" every two seconds until the non-decompression divable times of less than two minutes is reached.

What is claimed is:

1. A decompression data display device, comprising:

pressure sensing means for sensing a pressure of an environment in which a diver is;

determining means for determining whether a plurality of respective tissues of the diver's body are absorbing or discharging an inert gas;

tissue inert gas level data calculating means for calculating from the pressure sensed by said pressure sensing means data on a level of the inert gas in each of the tissues in accordance with a first arithmetic expression when said determining means determines that the tissues are absorbing the inert gas, and for calculating from the pressure sensed by said pressure sensing means data on the level of the inert gas in each of the tissues in accordance with a second arithmetic expression different from the first arithmetic expression when said determining means determines that the tissues are discharging the inert gas;

decompression data calculating means for calculating decompression data from data on the levels of the inert gas in each of the respective tissues calculated by said tissue inert gas level data calculating means; and display means for displaying the decompression data calculated by said decompression data calculating means.

2. A decompression data display device according to claim 1, further comprising:

a memory for storing data on the level of the inert gas in each of the tissues calculated by said tissue inert gas level data calculating means, and wherein said determining means comprises:
inspired gas inert gas level data calculating means for calculating data on a level of the inert gas in the inspired gas from the pressure sensed by said pressure sensing means; and comparing means for comparing the data on the level of the inert gas in the inspired gas calculated by said inspired gas inert gas level data calculating means with the data on the level of the inert gas in each of the respective tissues stored in said memory.

3. A decompression data display device according to claim 1, further comprising:

means for operating said determining means and said tissue inert gas level data calculating means at predetermined intervals of time such that tissue inert gas level data is updated at the predetermined intervals of time to calculate the decomposition data on the basis of the updated tissue inert gas level data.

4. A decompression data display device according to claim 1, wherein the inert gas comprises nitrogen.

5. A decompression data display device according to claim 1, wherein the second arithmetic expression comprises a version of the first arithmetic expression where a coefficient varies in dependence on each of the respective tissues.

6. A decompression data display device according to claim 5, wherein data on the coefficient which varies in dependence on each of the respective tissues is stored in an electrically erasable programmable read only memory.

7. A decompression data display device according to claim 5, wherein the coefficient which varies in dependence on each of the respective tissues is set by an externally operable switch.

8. A decompression data display device according to claim 1, wherein the first arithmetic expression uses data on a half saturation time as a variable; and the second arithmetic expression comprises a version of the first arithmetic expression in which data on the half saturation time in the first arithmetic expression is replaced with data on the product of the half saturation time and a coefficient which varies in dependence on each of the tissues.

9. A decompression data display device according to claim 8, wherein the first arithmetic expression is given by $$QN2(i)=PN2(i)+[PB-PN2(i)]\times(1-0.5^{T/Ht(i)});$$

and
the second arithmetic expression is given by $$QN2(i)=PN2(i)+[PB-PN2(i)]\times(1-0.5^{T/C \cdot Ht(i)}),$$

where
QN2(i) is data on a new inert gas level in a tissue (i);
PN2(i) is data on the last calculated inert gas level in the tissue (i);
T is a time elapsed since the last calculation;
PB is data on the level of an inert gas in a inspired gas;
Ht(i) is a half saturation time in the tissue (i); and
C is a coefficient varying in dependence on each of the tissues.

10. A decompression data display device, comprising:

pressure sensing means for sensing a pressure of an environment in which a diver is;

determining means for determining whether a plurality of respective tissues of the diver's body having different half saturation times are absorbing or discharging an inert gas;

tissue inert gas level data calculating means for calculating from the pressure sensed by said pressure sensing means data on a level of an inert gas in each of the tissues in accordance with an arithmetic expression which includes the half saturation time as an operand when said determining means determines that the tissue is absorbing the inert gas, and for calculating from the pressure sensed by said pressure sensing means data on the level of an inert gas in each of the tissues in accordance with a version of the arithmetic expression in which the half saturation time is modified with a coefficient varying in dependence on each of the tissues when said determining means determines that the tissue is discharging the inert gas;

decompression data calculating means for calculating decompression data from data on the inert gas level in each of the respective tissues calculated by said tissue inert gas level data calculating means; and display means for displaying the decompression data calculated by said decompression data calculating means.

11. A decompression data display device according to claim 10, further comprising:

a memory for storing data on the level of the inert gas in each of the tissues calculated by said tissue inert gas level data calculating means, and wherein said determining means comprises:
inspired gas inert gas level data calculating means for calculating data on a level of the inert gas in the inspired gas from the pressure sensed by said pressure sensing means; and comparing means for comparing the data on the level of the inert gas in the inspired gas calculated by said inspired gas inert gas level data calculating means with the data on the level of the inert gas in each of the respective tissues stored in said memory.

12. A decompression data display device according to claim 10, further comprising:

means for operating said determining means and said tissue inert gas level data calculating means at predetermined intervals of time such that tissue inert gas level data is updated at the predetermined intervals of time to calculate the decompression data on the basis of the updated tissue inert gas level data.

13. A decompression data display device according to claim 10, wherein the inert gas comprises nitrogen.

14. A decompression data display device according to claim 11, wherein data on the coefficient which varies in dependence on each of the respective tissues is stored in an electrically erasable programmable read only memory.

15. A decompression data display device according to claim 10, wherein the coefficient which varies in dependence on each of the respective tissues is set by an externally operable switch.

16. A method of obtaining data on a level of an inert gas in each of a plurality of tissues of a diver's body, comprising the steps of:

sensing the pressure of an environment in which the diver is;

determining whether the plurality of tissues of the diver's body are absorbing or discharging an inert gas;

calculating from the sensed pressure data on the level of the inert gas in each of the tissues in accordance with a first arithmetic expression when it is determined that the tissues are absorbing the inert gas, and for calculating from the sensed pressure data on the level of the inert gas in each of the tissues in accordance with a second arithmetic expression different from the first arithmetic expression when it is determined that the tissues are discharging the inert gas;

calculating decompression data from data on the level of the inert gas in each of the tissues; and displaying the calculated decompression data.

17. A method according to claim 16, further comprising the step of:

storing calculated data on the level of the inert gas in each of the tissues in a memory; and wherein said determining step comprises the steps of:
calculating data on a level of the inert gas in the inspired gas from the sensed pressure; and
comparing the data on the level of the inert gas in the inspired gas with the data stored in the memory.

18. A method according to claim 16, comprising the steps of:

operating said determining step and said tissue inert gas level data calculating step at predetermined intervals of time.

19. A method according to claim 16, wherein the step of determining comprises determining whether the plurality of tissues of the diver's body are absorbing or discharging nitrogen gas.

20. A method according to claim 16, wherein the second arithmetic expression comprises a version of the first arithmetic expression where a coefficient varies in dependence on each of the respective tissues.

21. A method according to claim 20, wherein data on the coefficient which varies in dependence on each of the respective tissues is stored in an electrically erasable programmable read only memory.

22. A method according to claim 20, wherein the coefficient which varies in dependence on each of the respective tissues is set externally.

23. A method according to claim 16, wherein the first arithmetic expression uses data on a half saturation time as a variable; and the second arithmetic expression comprises a version of the first arithmetic expression in which data on the half saturation time in the first arithmetic expression is replaced with data on the product of the half saturation time and a coefficient which varies in dependence on each of the tissues.

24. A method according to claim 16, wherein the first arithmetic expression is given by $$QN2(i)=PN2(i)+[PB-PN2(i)]\times(1-0.5^{t/Ht(i)});$$

and
the second arithmetic expression is given by $$QN2(i)=PN2(i)+[PB-PN2(i)]\times(1-0.5^{t/C\cdot Ht(i)}),$$

where
QN2(i) is data on a new inert gas level in a tissue (i);
PN2(i) is data on the last calculated inert gas level in the tissue (i);
t is a time elapsed since the last calculation;
PB is data on the level of an inert gas in a inspired gas;
Ht(i) is a half saturation time in the tissue (i); and
C is a coefficient varying in dependence on each of the tissues.

25. A method of obtaining data on a level of an inert gas in each of a plurality of tissues of a diver's body, comprising the steps of:

sensing the pressure of the environment in which a diver is;

determining whether the plurality tissues of the diver's body having different half saturation times which are the periods of time taken for the inert gas partial pressures in the respective tissues to reach 50% of their saturation values are absorbing or discharging an inert gas;

calculating from the sensed pressure data on the level of an inert gas in each of the tissues in accordance with an arithmetic expression which includes the half saturation time as an operand when it is determined that the tissue is absorbing the inert gas, and calculating from the sensed pressure data on the level of an inert gas in each of the tissues in accordance with a version of the arithmetic expression in which the half saturation time of that tissue is modified with a coefficient varying in dependence on that tissue when it is determined that that tissue is discharging the inert gas;

calculating decompression data from data on the calculated level of the inert gas in each of the tissues; and displaying the calculated decompression data.

26. A method according to claim 25, further comprising the step of:

storing calculated data on the level of the inert gas in each of the tissues in a memory; and wherein said determining step comprises the steps of:
calculating data on a level of the inert gas in the inspired gas from the sensed pressure; and
comparing the data on the level of the inert gas in the inspired gas with the data stored in the memory.

27. A method according to claim 25, comprising the steps of:

performing said determining step and said calculating step at a predetermined interval of time.

28. A method according to claim 25, wherein the step of determining comprises determining whether the plurality of tissues of the diver's body are absorbing or discharging nitrogen gas.

29. A method according to claim 25, wherein data on the coefficient which varies in dependence on each of the respective tissues is stored in an electrically erasable programmable read only memory.

30. A method according to claim 25, wherein the coefficient which varies in dependence on each of the respective tissues is set externally.

* * * * *